(12) United States Patent
Kang et al.

(10) Patent No.: US 9,961,716 B2
(45) Date of Patent: *May 1, 2018

(54) APPARATUS AND METHOD FOR OPTIONALLY USING SECONDARY FREQUENCY ASSIGNMENT IN A WIRELESS COMMUNICATION SYSTEM USING MULTIPLE BANDS

(75) Inventors: Hyun-Jeong Kang, Seoul (KR); Won-Il Roh, Yongin-si (KR); Jae-Hee Cho, Seoul (KR); Jung-Je Son, Yongin-si (KR); Byung-Wook Jun, Seoul (KR)

(73) Assignee: UNWIRIED PLANET INTERNATIONAL LIMITED, Dublin (IE)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/420,010

(22) Filed: Mar. 14, 2012

(65) Prior Publication Data

US 2012/0170456 A1    Jul. 5, 2012

Related U.S. Application Data

(63) Continuation of application No. 12/542,175, filed on Aug. 17, 2009, now Pat. No. 8,149,777.

(30) Foreign Application Priority Data

Aug. 18, 2008 (KR) .................. 10-2008-0080356
May 27, 2009 (KR) .................. 10-2009-0046676

(51) Int. Cl.
*H04W 72/04*  (2009.01)
*H04W 28/08*  (2009.01)
(Continued)

(52) U.S. Cl.
CPC ...... *H04W 76/048* (2013.01); *H04W 52/0261* (2013.01); *H04W 72/0453* (2013.01); *H04W 76/064* (2013.01); *Y02B 60/50* (2013.01)

(58) Field of Classification Search
CPC . H04W 36/06; H04W 72/04; H04W 72/0453; H04W 76/02; H04W 76/064;
(Continued)

(56) References Cited

U.S. PATENT DOCUMENTS 6,212,388 B1    4/2001  Seo et al.
7,068,623 B1    6/2006  Barany et al.
(Continued)

FOREIGN PATENT DOCUMENTS

CN    1717092 A    1/2006
CN    1894864 A    1/2007
(Continued)

*Primary Examiner* — Ahmed Elallam

(57) ABSTRACT

Methods for operating a Base Station (BS) and a User Equipment (UE) in a wireless communication system using a primary frequency and one or more secondary frequencies, and apparatuses for the BS and UE for carry out the methods, are provided. The method for operating the BS includes determining whether to activate or deactivate at least one of the one or more secondary frequencies, and transmitting a message comprising a bitmap indicating the activation or deactivation of the at least one of the one or more secondary frequencies to the UE. The method for operating the UE includes receiving a message comprising a bitmap indicating activation or deactivation of at least one of the one or more secondary frequencies from the BS, and activating or deactivating the at least one of the one or more secondary frequencies based on the received message.

40 Claims, 13 Drawing Sheets

(51) Int. Cl.
*H04W 52/02* (2009.01)
*H04W 36/36* (2009.01)
*H04W 76/04* (2009.01)
*H04W 76/06* (2009.01)

(58) Field of Classification Search
CPC .......... H04W 52/0261; H04W 52/0277; Y02B 60/50
USPC ....... 370/252, 254, 311, 328, 329, 330, 331, 370/338, 343, 437, 468; 455/423, 436, 455/450, 452.1
See application file for complete search history.

(56) References Cited

U.S. PATENT DOCUMENTS

| | | | |
|---|---|---|---|
| 7,286,609 | B2 | 10/2007 | Maltsev et al. |
| 7,457,588 | B2 | 11/2008 | Love et al. |
| 7,502,341 | B2 | 3/2009 | Matoba et al. |
| 7,865,192 | B2* | 1/2011 | Fukumoto ............. H04W 72/02 455/435.3 |
| 7,936,717 | B2 | 5/2011 | Cho et al. |
| 8,027,682 | B2* | 9/2011 | Kang .................... H04W 72/02 370/331 |
| 8,149,777 | B2* | 4/2012 | Kang .................... H04W 76/048 370/311 |
| 8,311,011 | B2* | 11/2012 | Kim ..................... H04W 52/287 370/311 |
| 8,521,166 | B2* | 8/2013 | Kang .................... H04W 36/06 370/208 |
| 8,681,732 | B2* | 3/2014 | Park ..................... H04W 36/06 370/328 |
| 8,699,459 | B2* | 4/2014 | Jung .................. H04W 36/0061 370/331 |
| 8,724,570 | B2* | 5/2014 | Lee ....................... H04L 5/0053 370/329 |
| 8,929,301 | B2* | 1/2015 | Cave ................. H04W 52/0216 370/311 |
| 9,136,990 | B2* | 9/2015 | Marinier ................... H04L 5/00 |
| 9,155,039 | B2* | 10/2015 | Jung .................... H04L 25/4917 |
| 9,155,041 | B2* | 10/2015 | Jung .................... H04L 25/4917 |
| 9,258,074 | B2* | 2/2016 | Kosaka ............... H04W 56/002 |
| 9,357,487 | B2* | 5/2016 | Jung .................... H04L 25/4917 |
| 9,628,984 | B2* | 4/2017 | Kim ....................... H04L 5/0007 |
| 9,749,994 | B2* | 8/2017 | Fong ................. H04W 72/0406 |
| 2002/0128051 | A1 | 9/2002 | Liebenow |
| 2005/0152466 | A1 | 7/2005 | Maltsev et al. |
| 2005/0197133 | A1 | 9/2005 | Hong et al. |
| 2005/0232181 | A1 | 10/2005 | Park et al. |
| 2005/0233715 | A1* | 10/2005 | Laroia ................... H04B 1/005 455/133 |
| 2005/0266896 | A1* | 12/2005 | Son ..................... H04B 1/1615 455/574 |
| 2006/0009230 | A1* | 1/2006 | Fukumoto ............. H04W 72/02 455/452.1 |
| 2007/0036179 | A1* | 2/2007 | Palanki et al. ................. 370/491 |
| 2009/0029710 | A1 | 1/2009 | Ochiai et al. |
| 2009/0092091 | A1* | 4/2009 | Balasubramanian . H04L 5/0064 370/329 |
| 2009/0163158 | A1* | 6/2009 | Chitrapu et al. ........... 455/127.5 |
| 2009/0219910 | A1 | 9/2009 | Han et al. |
| 2009/0245178 | A1* | 10/2009 | Gholmieh et al. ........... 370/328 |
| 2009/0257387 | A1* | 10/2009 | Gholmieh et al. ........... 370/329 |
| 2009/0316575 | A1* | 12/2009 | Gholmieh et al. ........... 370/225 |
| 2010/0118723 | A1* | 5/2010 | Pani et al. ..................... 370/252 |
| 2010/0222059 | A1* | 9/2010 | Pani et al. ..................... 455/436 |
| 2010/0271941 | A1* | 10/2010 | Park ...................... H04W 36/06 370/230 |
| 2011/0002281 | A1* | 1/2011 | Terry et al. ..................... 370/329 |
| 2011/0116467 | A1* | 5/2011 | Jung .................... H04L 25/4917 370/329 |
| 2011/0200138 | A1 | 8/2011 | Ode et al. |
| 2012/0106421 | A1* | 5/2012 | Yoon ................. H04W 52/0212 370/311 |
| 2012/0269249 | A1 | 10/2012 | Ishii et al. |
| 2013/0288683 | A1* | 10/2013 | Kang .................... H04W 36/06 455/436 |
| 2015/0055533 | A1* | 2/2015 | Jung et al. ..................... 370/311 |
| 2015/0271750 | A1* | 9/2015 | Jung .................... H04L 25/4917 370/311 |
| 2015/0351099 | A1* | 12/2015 | Marinier ............... H04W 72/04 370/329 |
| 2016/0095097 | A1* | 3/2016 | Han ..................... H04J 11/0069 370/329 |

FOREIGN PATENT DOCUMENTS

| | | |
|---|---|---|
| CN | 1965554 A | 5/2007 |
| CN | 101064563 A | 10/2007 |
| CN | 101242664 A | 8/2008 |
| EP | 1768291 A1 | 3/2007 |
| EP | 2104371 A1 | 9/2009 |
| JP | 2002-010329 A | 1/2002 |
| JP | 2008-079282 A | 4/2008 |
| JP | 2008-546346 A | 12/2008 |
| JP | 2011-518655 A | 6/2011 |
| KR | 10-2005-0091597 | 9/2005 |
| KR | 10-2008-0066898 A | 7/2008 |
| WO | 2007/050687 A2 | 5/2007 |
| WO | 2007/051140 A2 | 5/2007 |
| WO | 2008085009 A1 | 7/2008 |
| WO | 2008092399 A1 | 8/2008 |
| WO | 2010/008228 A1 | 1/2010 |

* cited by examiner

APPARATUS AND METHOD FOR OPTIONALLY USING SECONDARY FREQUENCY ASSIGNMENT IN A WIRELESS COMMUNICATION SYSTEM USING MULTIPLE BANDS

CROSS-REFERENCE TO RELATED APPLICATIONS

This application is a continuation of prior application Ser. No. 12/542,175, filed Aug. 17, 2009, which claims the benefit under 35 U.S.C. § 119(a) of a Korean patent application filed in the Korean Intellectual Property Office on Aug. 18, 2008 and assigned Serial No. 10-2008-0080356 and a Korean patent application filed in the Korean Intellectual Property Office on May 27, 2009 and assigned Serial No. 10-2009-0046676, the entire disclosures of each of which are hereby incorporated by reference.

BACKGROUND OF THE INVENTION

1. Field of the Invention

The present invention relates to a broadband wireless communication system using multiple bands. More particularly, the present invention relates to an apparatus and a method for reducing power consumption of a Mobile Station (MS) in the broadband wireless communication system using the multiple bands.

2. Description of the Related Art

In accordance with advances of wireless communication systems, various types and high quality of services provided by the wireless communication systems are demanded. To meet those demands, a broadband wireless communication system is drawing attention. As available frequency resources in the wireless communication system are limited, available frequency bands in the broadband wireless communication system are also limited. To offer a broadband service, the available frequency bands needs to increase.

FIGS. 1A and 1B are diagrams illustrating simplified structures for supporting a single frequency band and a simplified structure for supporting two frequency bands in a conventional wireless communication system.

In the wireless communication system, more particularly, in the broadband wireless communication system represented by the Institute of Electrical and Electronics Engineers (IEEE) 802.16 standard, a Base Station (BS) operates one Frequency Assignment (FA) or two or more FAs. The BS offers a radio communication service to a Mobile Station (MS) through its FA.

Referring to FIG. 1A, an MS 100 may migrate from an FA1 region 120 to an FA2 region 140. Herein, the FA1 region 120 is a service coverage area where the MS 100 uses the radio communication service using an FA1, and the FA2 region 140 is a service coverage area where the MS 100 uses the radio communication service using an FA2. When the MS 100 traveling in the FA1 region 120 may operate only one FA or when the FA1 and the FA2 are managed by different BSs, the MS 100 hands over between the FAs and uses the radio communication service using the FA2.

Referring to FIG. 1B, when an MS 150 may operate two or more FAs or when two or more FAs are managed by the single BS, the MS 150 may use the radio communication service in both of the FA1 region 160 and the FA2 region 180. As such, when transmitting and receiving signals over the multiple frequency bands, the MS and the BS may send mass data at a high data rate.

As discussed above, by use of the multiple frequency bands at the same time, the system may offer the high-capacity services at a high data rate. However, currently, there is no band use control procedure for effective utilization of the multiple frequency bands. As a result, it is not possible to regulate the bands adaptively used based on a resource usage rate and a channel condition, and use of a secondary FA increases power consumption of the MS.

SUMMARY OF THE INVENTION

An aspect of the present invention is to address at least the above mentioned problems and/or disadvantages and to provide at least the advantages described below. Accordingly, an aspect of the present invention is to provide an apparatus and a method for efficiently using multiple frequency bands between a Mobile Station (MS) and a Base Station (BS) in a broadband wireless communication system.

Another aspect of the present invention is to provide an apparatus and a method for regulating Frequency Assignments (FAs) optionally used according to a resource utilization rate and a channel condition in a broadband wireless communication system.

Yet another aspect of the present invention is to provide an apparatus and a method for reducing power consumption in using secondary FAs in a broadband wireless communication system.

Still another aspect of the present invention is to provide an apparatus and a method for suspending use of a secondary FA in a broadband wireless communication system.

A further aspect of the present invention is to provide an apparatus and a method for resuming use of a suspended secondary FA in a broadband wireless communication system.

According to an aspect of the present invention, a method for operating a BS in a wireless communication system using a primary frequency and one or more secondary frequencies is provided. The method includes determining whether to activate or deactivate at least one of the one or more secondary frequencies, and transmitting a message comprising a bitmap indicating the activation or deactivation of the at least one of the one or more secondary frequencies to a User Equipment (UE).

According to another aspect of the present invention, a method for operating a UE in a wireless communication system using a primary frequency and one or more secondary frequencies is provided. The method includes receiving a message comprising a bitmap indicating activation or deactivation of at least one of the one or more secondary frequencies from a BS, and activating or deactivating the at least one of the one or more secondary frequencies based on the received message.

According to yet another aspect of the present invention, an apparatus for a BS in a wireless communication system using a primary frequency and one or more secondary frequencies is provided. The apparatus includes a controller configured to determine whether to activate or deactivate at least one of the one or more secondary frequencies, and a transmitter configured to transmit a message comprising a bitmap indicating the activation or deactivation of the at least one of the one or more secondary frequencies to a UE.

According to still another aspect of the present invention, an apparatus for a UE in a wireless communication system using a primary frequency and one or more secondary frequencies is provided. The apparatus includes a receiver configured to receive a message comprising a bitmap indicating activation or deactivation of at least one of the one or more secondary frequencies from a BS, and a controller configured to activate or deactivate the at least one of the one or more secondary frequencies based on the received message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for minimizing power consumption in using secondary Frequency Assignment (FA) in a broadband wireless communication system using multiple bands. Hereinafter, Orthogonal Frequency Division Multiplexing (OFDM)/Orthogonal Frequency Division Multiple Access (OFDMA) wireless communication system is illustrated by way of example. Note that the present invention is applicable to other wireless communication systems.

Hereinafter, a mode for transmitting and receiving signals between a Mobile Station (MS) and a Base Station (BS) through multiple FAs is referred to as an overlay mode. The term "MS" may also be referred to as "User Equipment (UE)." A wireless communication system operating in the overlay mode is referred to as an overlay wireless communication system.

Figure 1A:
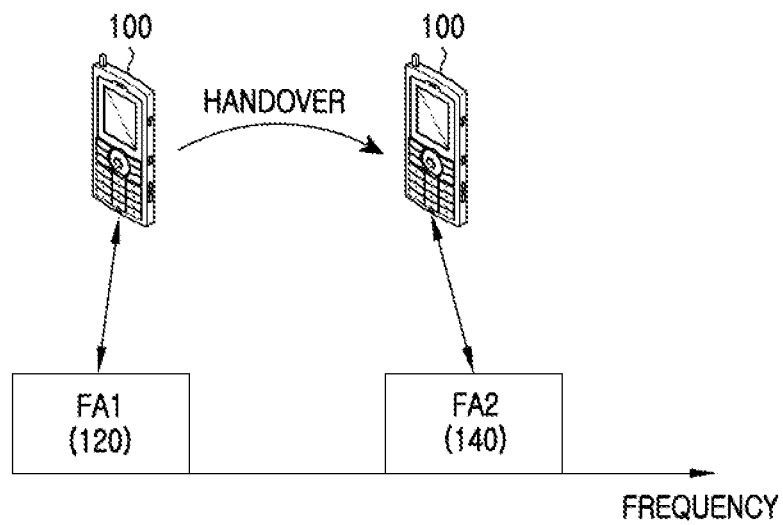
FIGS. 1A and 1B are diagrams illustrating simplified structures according to a number of Frequency Assignments (FAs) supported in a wireless communication system.
Figure 1B:
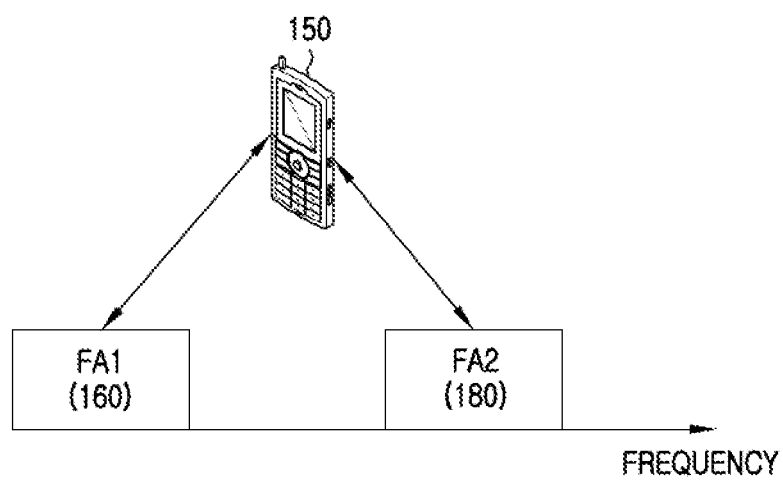
Figure 2:
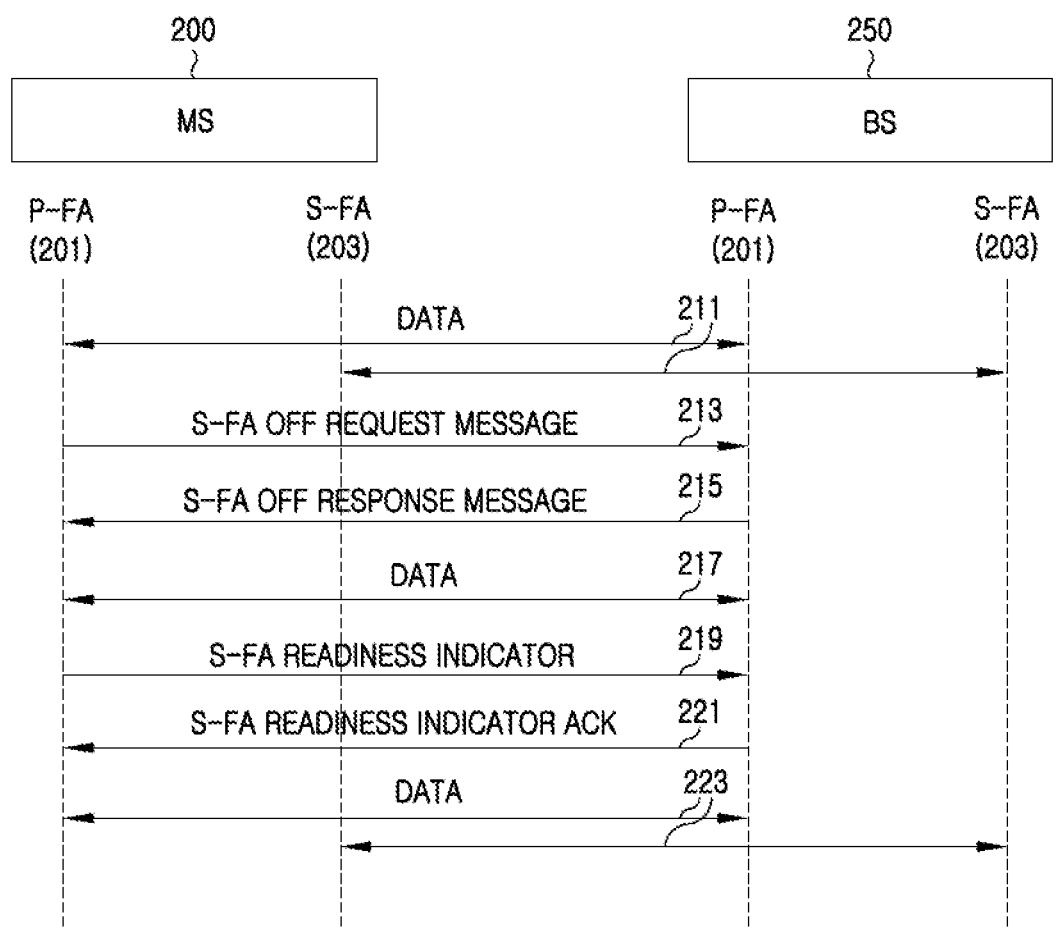
FIG. 2 is a diagram illustrating signal exchanges for Secondary (S)-FA on-off in a broadband wireless communication system according to an exemplary embodiment of the present invention.

FIG. 2 is a diagram illustrating signal exchanges for secondary FA on-off in an overlay wireless communication system according to an exemplary embodiment of the present invention. In FIG. 2, an MS 200 and a BS 250 manage two frequency bands, that is, a Primary (P)-FA 251 and a Secondary (S)-FA 253. Notably, the procedure of FIG. 2 is applicable to a system which manages three or more FAs, that is, one P-FA and two or more S-FAs.

Referring to FIG. 2, the MS 200 transmits and receives data with the BS 250 over its P-FA 201, and transmits and receives data with the BS 250 over its S-FA 203 in step 211. Herein, the P-FA 201 is determined at an initial connection of the MS 200. Accordingly, when a plurality of MSs exists, the P-FAs of the MSs may be allocated to different FAs. That is, the P-FA of a certain MS may be the S-FA of another MS.

In the process of the data communication, the MS 200 determines based on its battery status whether it needs to suspend use of the S-FA 203. The suspension of the S-FA 203 is determined based on a signal strength measurement value of the S-FA 203 and power consumption. For example, when the signal strength measurement value of the corresponding S-FA is less than a threshold required for data delivery or when the remaining capacity of the battery is insufficient to keep using the S-FA 203, the MS 200 determines to suspend the use of the S-FA 203.

Upon determining the suspension of the S-FA 203, the MS 200 sends an S-FA off request message to the BS 250 to request the suspension of the usage of the S-FA 203 in step 213. The S-FA off request message includes indication information of the S-FA 203 requested to suspend. For example, the indication information is one of frequency information of the S-FA 203, an index of the S-FA 203, and an S-FA bitmap representing the S-FA 203. Herein, the index is a physical carrier index or a logical carrier index. The bitmap size is equal to a number of the S-FAs allocated to the MS 200. When the S-FAs allocated to the MS 200 are different from the S-FAs actually used by the MS 200, the bitmap size is determined by the number of the S-FAs actually used by the MS 200 and indicates a particular S-FA to suspend among the S-FAs actually used by the MS 200. When the MS 200 is able to predict an off duration of the S-FA 203 by analyzing occurrence of uplink data, the MS 200 may add information indicative of the off duration of the S-FA 203 to the off request message. The information indicative of the off duration contained in the off request message may be used for the BS 250 to perform data scheduling of the MS 200.

The BS 250, receiving the off request message from the MS 200, sends an S-FA off response message in reply to the off request message in step 215. Herein, the S-FA off response message includes an indicator indicative of the approval or disapproval of the use suspension request of the S-FA 203. Accordingly, the MS 200 and the BS 250 recognize the suspension of the S-FA 203 and transmit and receive data only over the P-FA 250 in step 217. When using two or more S-FAs in contrast to FIG. 2, the MS 200 transmits and receives data over at least one S-FA excluding the suspended S-FA 203 and the P-FA.

Next, if it is determined that the data transmission and reception with the BS 250 is possible using the S-FA 203, the MS 200 sends an S-FA readiness indicator to the BS 250 to inform the BS 250 of the availability of the S-FA 203 in step 219. In so doing, the MS 200 may perform a ranging procedure for the S-FA 203 if necessary.

Upon receiving the S-FA readiness indicator, the BS 250 determines whether to allow the use resumption of the suspended S-FA and sends an S-FA readiness indicator ACK to the MS 200 in step 221. Whether to permit the use resumption of the suspended S-FA is determined based on the signal strength measurement value of the S-FA 203 reported by the MS 200, the load of the S-FA 203, and the existence and the number of MSs using the S-FA 203 as the P-FA. Hence, the S-FA readiness indicator ACK includes one of information informing of the permission to transmit and receive data over the S-FA 203 of the MS 200, information informing of the disapproval on the data delivery over the S-FA 203 of the MS 200, and information requesting to use other FA than the S-FA 203. When the use of the S-FA 203 is not allowed, the BS 250 adds frequency information or FA identification information of the other FAs to the S-FA readiness indicator ACK. At this time, it is assumed that the data transfer over the S-FA 203 of the MS 200 is permitted.

Upon confirming the permission of the data transfer with the BS 250 over the S-FA 203 from the S-FA readiness indicator ACK, the MS 200 transmits and receives data with the BS 250 over the P-FA 201 and data with the BS 250 over the S-FA 203 in step 223.

In FIG. 2, the MS sends a message for turning off the S-FA. Also, the MS may request the entrance into a sleep mode and the use suspension of the S-FA together, which shall be described below in detail by referring to FIG. 3.

Figure 3:
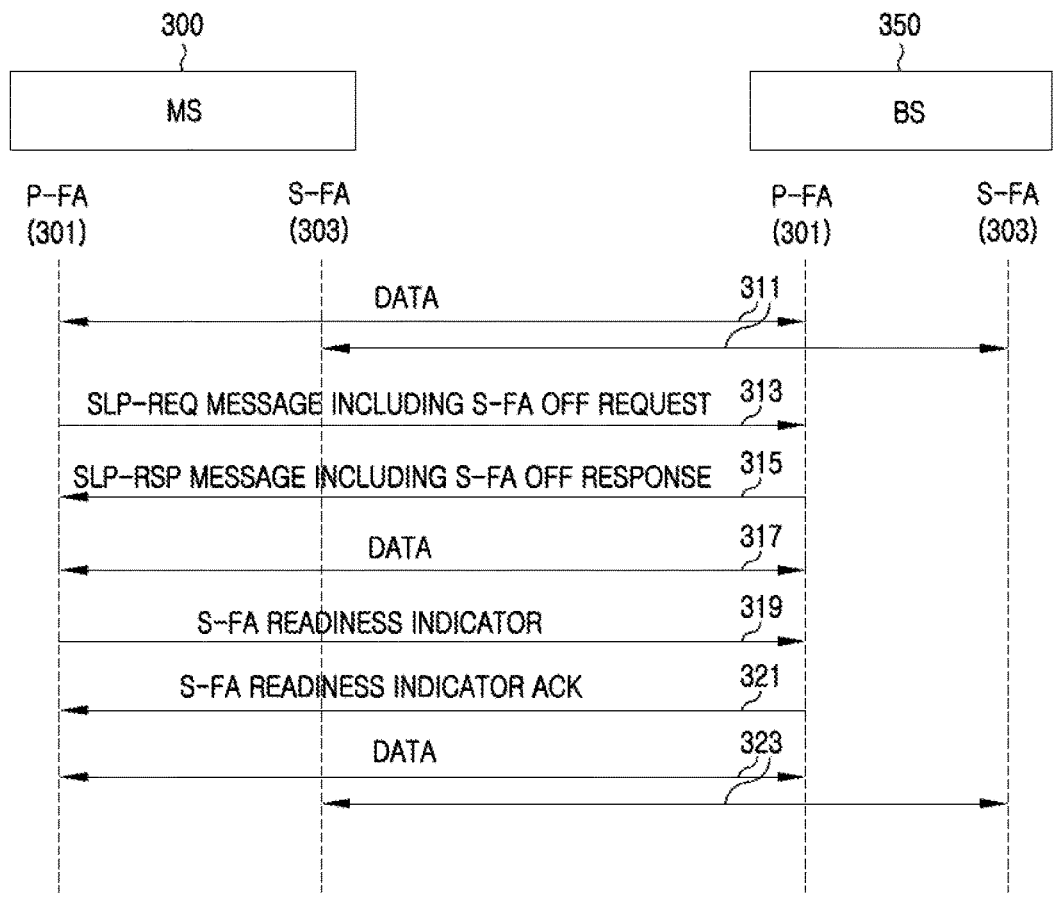
FIG. 3 is a diagram illustrating signal exchanges for S-FA on-off in a broadband wireless communication system according to an exemplary embodiment of the present invention.

FIG. 3 is a diagram illustrating signal exchanges for S-FA on-off in an overlay wireless communication system according to an exemplary embodiment of the present invention.

Referring now to FIG. 3, an MS 300 transmits and receives data with a BS 350 over the P-FA 301 and data with the BS 350 over the S-FA 303 in step 311. Herein, the S-FA 301 is determined at the initial connection of the MS 300. When a plurality of MSs exists, the P-FAs of the MSs may be set to different FAs. That is, the P-FA of a particular MS may be the S-FA of another MS.

The MS 300 determines to enter into the sleep mode and concurrently determines to stop using the S-FA 303. The suspension of the S-FA 303 is determined based on a signal strength measurement value of the S-FA 303 and power consumption. For example, when the signal strength measurement value of the corresponding S-FA is less than a threshold required for the data delivery or when the remaining capacity of the battery is insufficient to keep using the S-FA 303, the MS 300 determines to stop using the S-FA 303.

The MS 300 sends a SLeeP (SLP)-REQuest (REQ) message including an S-FA off request which requests to suspend the use of the S-FA 303, to the BS 350 in step 313. The S-FA off request includes indication information of the S-FA 303 requested to stop. For example, the indication information is one of the frequency information of the S-FA 303, the index of the S-FA 303, and the S-FA bitmap representing the S-FA 303. Herein, the index is the physical carrier index or the logical carrier index. The bitmap size is equal to the number of the S-FAs allocated to the MS 300. When the S-FAs allocated to the MS 300 differ from the S-FAs actually used by the MS 300, the bitmap size is determined according to the number of the S-FAs actually used by the MS 300 and is used to indicate a particular S-FA to suspend among the S-FAs actually used by the MS 300. The S-FA off request may include off duration information of the S-FA 303.

Upon receiving the S-FA off request together with the SLP-REQ message, the BS 350 sends a SLP-ReSPonse (RSP) message including a response for the S-FA off request to the MS 300 in step 315. The response for the S-FA off request includes an indicator indicative of the approval or the disapproval of the S-FA off request of the MS 300.

The MS 300, receiving the SLP-RSP message, enters the sleep mode as indicated by the SLP-RSP message, concurrently stops using the S-FA 303, and transmits and receives data with the BS 350 over the P-FA 301 in a listening interval of the sleep mode in step 317. While the SLP-REQ/ RSP procedures are conducted in steps 313 and 315, the entrance into the sleep mode of the MS 300 may not be permitted. Even when the entrance into the sleep mode is not permitted, the S-FA off request and/or response for the S-FA 303 is still effective. In this situation, the MS 300 transmits and receives data with the BS 350 only through the P-FA 301 without entering into the sleep mode. In contrast to FIG. 3, when using two or more S-FAs, the MS 300 transmits and receives data over at least one S-FA excluding the suspended S-FA 303 and the P-FA.

The MS 300 entering into the sleep mode determines that it is possible to transmit and receive data over the S-FA 303. Thus, to inform the BS 350 of the communication resumption using the S-FA 303, the MS 300 sends an S-FA readiness indicator over the P-FA 301 in step 319.

The BS 350 receiving the S-FA readiness indicator determines whether to allow the use resumption of the suspended S-FA and then sends an S-FA readiness indicator ACK to the MS 300 in step 321. Whether to allow the use resumption of the suspended S-FA is determined based on the signal strength measurement value of the S-FA 303 reported from the MS 300, the load of the S-FA 303, and the existence and the number of MSs using the S-FA 303 as their P-FA. The S-FA readiness indicator ACK includes information informing of the permission of the data transfer over the S-FA 303 of the MS 300, information informing of the prohibition on the data transfer over the S-FA 303 of the MS 300, or information requesting to use other FA than the S-FA 303. When the use of the S-FA 303 is not permitted, the BS 350 adds the frequency information or the FA identifier information of the other FA to the S-FA readiness indicator ACK. At this time, it is assumed that the data delivery over the S-FA 303 of the MS 300 is permitted.

After confirming the permission on the data transfer with the BS 350 over the S-FA 303 from the S-FA readiness indicator ACK, the MS 300 transmits and receives data with the BS 350 over the P-FA 301 in the listening interval of the sleep mode and data with the BS 350 over the S-FA 303 in step 323. The S-FA readiness indicator and the S-FA readiness indicator ACK used to resume the suspended S-FA in the sleep mode may be added to one of a control message of a Media Access Control (MAC) layer defined to control the sleep mode, and a MAC layer header.

The MS requests the sleep mode entrance in FIG. 3, whereas the MS may add the S-FA off request to the SLP-RSP message even when the BS requests the sleep mode entrance. In this situation, the BS receiving the SLP-RSP message including the S-FA off request from the MS, recognizes the suspension of the S-FA of the MS.

Figure 4:
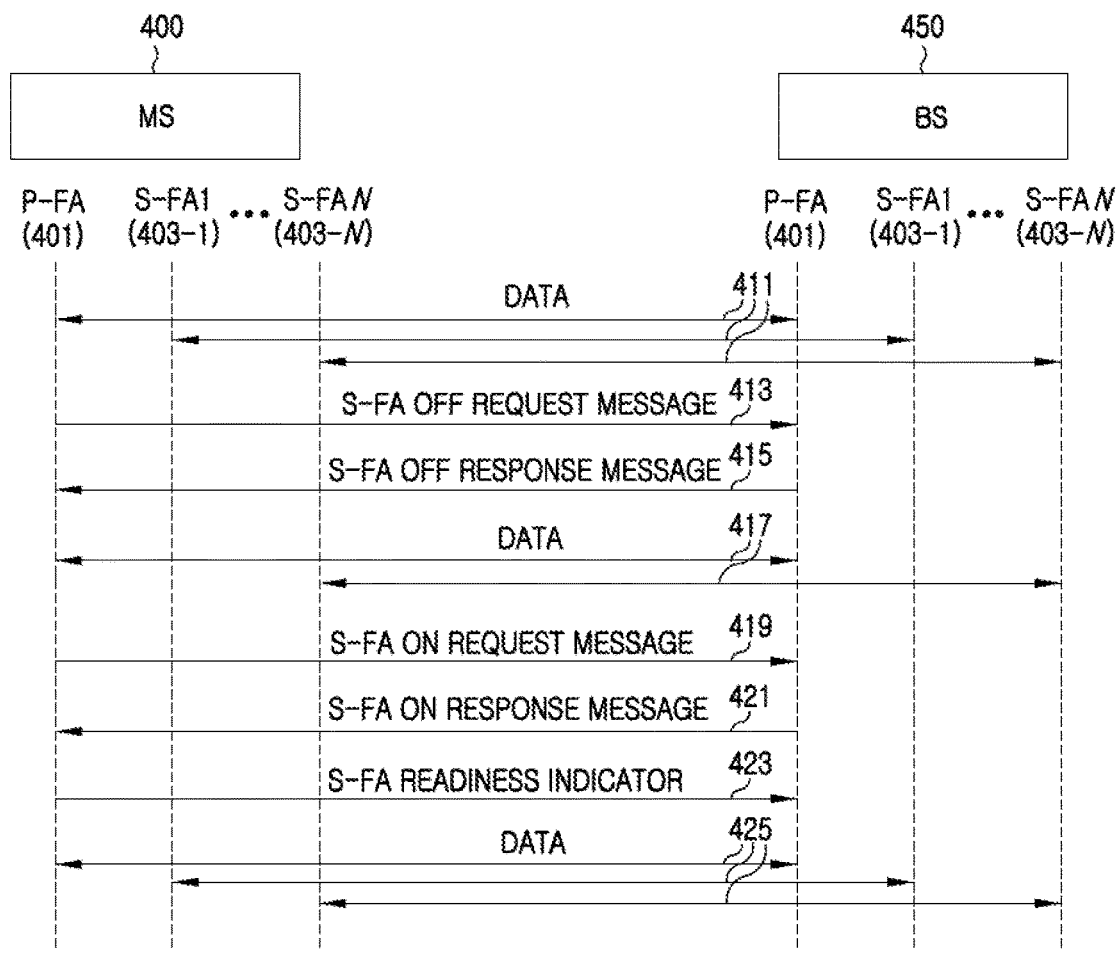
FIG. 4 is a diagram illustrating signal exchanges for S-FA on-off in a broadband wireless communication system according to an exemplary embodiment of the present invention.

FIG. 4 is a diagram illustrating signal exchanges for S-FA on-off in an overlay wireless communication system according to an exemplary embodiment of the present invention. In FIG. 4, an MS 400 and a BS 450 employ (N+1)-ary FAs, that is, one P-FA 401 and N-ary S-FAs 403-1 through 403-N. Note that the procedures in FIG. 4 are applicable to two FAs, that is, to one P-FA and one S-FA.

Referring to FIG. 4, the MS 400 transmits and receives data to and from the BS 450 over the P-FA 401 and the N-ary S-FAs 403-1 through 403-N in step 411. Herein, the P-FA 401 is determined at the initial connection of the MS 400. Accordingly, when a plurality of MSs exists, the P-FAs of the MSs may be set to different FAs. That is, the P-FA of a particular MS may be the S-FA of another MS.

In the process of the data communication, the MS 400 determines to suspend at least one of the N-ary S-FAs 403-1 through 403-N based on its battery status. The suspension of the at least one S-FA is determined based on the signal strength measurement value and the power consumption of each S-FA. For example, when the signal strength measurement value of the corresponding S-FA is less than a threshold required for the data delivery or when the remaining capacity of the battery is not enough to keep using the (N+1)-ary S-FAs, the MS 400 determines to suspend the usage of at least one of the N-ary S-FAs 403-1 through 403-N. Hereafter, it is assumed that the S-FA1 403-1 is suspended.

Determining to suspend the S-FA1 403-1, the MS 400 sends an S-FA off request message, which requests to suspend the S-FA1 403-1, to the BS 450 in step 413. The S-FA off request message includes indication information of the S-FA1 403-1 requested to suspend. For example, the indication information may include an index of the S-FA1 403-1 or the S-FA bitmap information representing the S-FA1 403-1. Herein, the index is a physical carrier index or a logical carrier index. The bitmap size is equal to the number of the S-FAs allocated to the MS 400. When the S-FAs allocated to the MS 400 differ from the S-FAs actually used by the MS 400, the bitmap size is determined by the number of the S-FAs actually used by the MS 400 and is used to represent a particular S-FA to suspend among the S-FAs actually used by the MS 400. When the MS 400 is able to predict the off duration of the S-FA1 403-1 by analyzing occurrence of uplink data, the MS 400 adds information indicative of the off duration to the S-FA off request message. The information indicative of the off duration contained in the S-FA off request message may be used for the BS 450 to perform data scheduling of the MS 400.

The BS 450, receiving the off request message from the MS 400, sends an S-FA off response message in reply to the off request message in step 415. Accordingly, the MS 400 and the BS 450 recognize the suspension of the use of the S-FA1 403-1 and transmit and receive data over the other FAs than the suspended S-FA in step 417.

Next, when determining the resumption of the S-FA1 403-1, the MS 400 sends an S-FA on request message, which requests the BS 450 to resume the S-FA1 403-1, to the BS 450 in step 419.

Upon receiving the S-FA on request message, the BS 450 determines whether to allow the resumption of the suspended S-FA and sends an S-FA on response message to the MS 400 in step 421. Whether to allow the use resumption of the suspended S-FA1 403-1 is determined based on the signal strength measurement value of the S-FA1 403-1 reported from the MS 400, the load of the S-FA1 403-1, and the existence and the number of MSs which use the S-FA1 403-1 as their P-FA. The S-FA on response message includes one of the information informing of the permission on the resumption of the suspended S-FA, the information informing of the disapproval of the resumption of the suspended S-FA, and the information requesting to use other FA than the suspended S-FA. To direct to use the other FA, the BS 450 adds frequency information or FA identifier information of the other FA to the S-FA on response message. Hereafter, it is assumed that the communication over the suspended S-FA is permitted.

Upon confirming the permission of the resumption of the suspended S-FA from the S-FA on response message, the MS 400 completes the preparation for the resumption of the suspended S-FA and then sends an S-FA readiness indicator in step 423. For example, the preparation for the resumption includes synchronization procedure such as ranging, hardware status transition, and so on. Herein, unlike the readiness indicators of FIGS. 2 and 3, the S-FA readiness indicator is used to inform that the resumption of the suspended S-FA may be started.

After sending the S-FA readiness indicator, the MS 400 transmits and receives data to and from the BS 450 over the P-FA 401 and the N-ary S-FAs 403-1 through 403-N in step 425.

In FIG. 4, the MS sends the message for the off of the S-FA. In addition, the MS may request the suspension of the S-FA together with the request for the sleep mode entrance, which is now described in detail by referring to FIG. 5.

Figure 5:
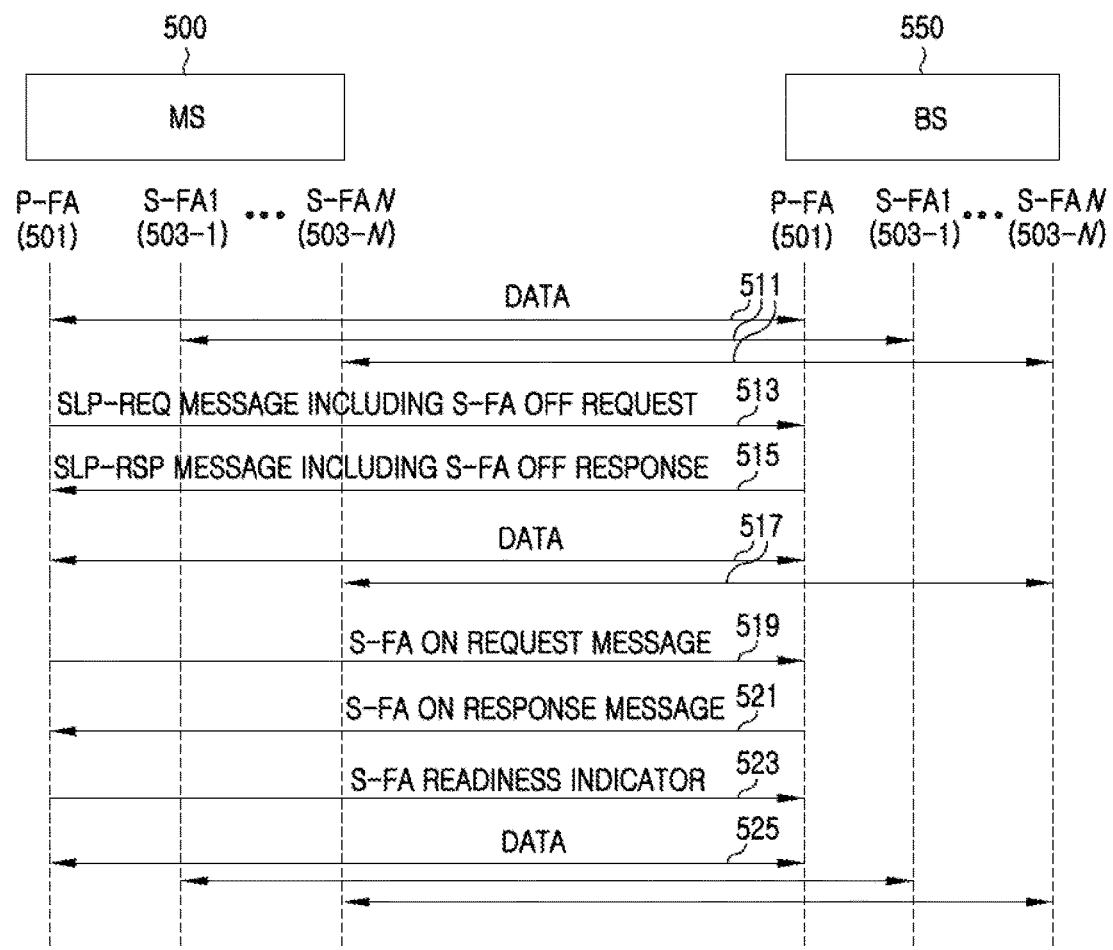
FIG. 5 is a diagram illustrating signal exchanges for S-FA on-off in a broadband wireless communication system according to an exemplary embodiment of the present invention.

FIG. 5 is a diagram illustrating signal exchanges for S-FA on-off in an overlay wireless communication system according to an exemplary embodiment of the present invention.

In FIG. 5, an MS 500 transmits and receives data to and from a BS 550 over the P-FA 501 and the N-ary S-FAs 503-1 through 503-N in step 511. Herein, the P-FA 501 is determined at the initial connection of the MS 500. Accordingly, when a plurality of MSs exists, the P-FAs of the MSs may be set to different FAs. That is, the P-FA of a particular MS may be the S-FA of another MS.

The MS 500 concurrently determines to enter into the sleep mode and to suspend at least one of the N-ary S-FAs 503-1 through 503-N. The suspension of the S-FA is determined based on the signal strength measurement value and the power consumption of each S-FA. For example, when a signal strength measurement value of the corresponding S-FA is less than a threshold required for the data delivery or when the remaining capacity of the battery is insufficient to keep using the (N+1)-ary S-FAs, the MS 500 determines to suspend the usage of at least one of the N-ary S-FAs 503-1 through 503-N. Hereafter, it is assumed that the S-FA1 503-1 is suspended.

The MS 500 sends a SLP-REQ message including an S-FA off request which requests to suspend the use of the S-FA1 503-1, to the BS 550 in step 513. The S-FA off request includes indication information of the S-FA1 503-1 requested to stop. For example, the indication information is one of the frequency information of the S-FA1 503-1, the index of the S-FA1 503-1, and the S-FA bitmap representing the S-FA1 503-1. Herein, the index is the physical carrier index or the logical carrier index. The bitmap size is equal to the number of the S-FAs allocated to the MS 500. When the S-FAs allocated to the MS 500 differ from the S-FAs actually used by the MS 500, the bitmap size is determined by the number of the S-FAs actually used by the MS 500 and is used to indicate a particular S-FA to suspend among the S-FAs actually used by the MS 500.

The S-FA off request may include the off duration information of the suspended S-FA.

Upon receiving the SLP-REQ message, the BS 550 determines whether to allow the sleep mode entrance and sends a SLP-RSP message informing of the approval or the disapproval to the MS 500 in step 515. According to the S-FA off request in the SLP-REQ message, the BS 550 adds an S-FA off response to the SLP-RSP message.

The MS 500, receiving the SLP-RSP message, enters into the sleep mode as indicated by the SLP-RSP message, concurrently stops using the S-FA1 503-1, and transmits and receives data with the BS 550 over the other FAs than S-FA1 503-1 in the listening interval of the sleep mode in step 517. While the SLP-REQ/RSP procedures are conducted in steps 513 and 515, the entrance into the sleep mode of the MS 500 may not be permitted. Even when the entrance into the sleep mode is not permitted, the S-FA off request and/or response for the S-FA1 503-1 is still effective. In this situation, the MS 500 transmits and receives data with the BS 550 over at least one FA excluding the S-FA1 503-1 without entering the sleep mode.

Next, upon determining to resume the S-FA1 503-1, the MS 500 sends an S-FA on request message, which requests the BS 550 to resume using the S-FA1 503-1, to the BS 550 in step 519. In so doing, the MS 500 may perform the ranging procedure for the S-FA1 503-1.

Upon receiving the S-FA on request message, the BS 550 determines whether to allow the resumption of the suspended S-FA and sends an S-FA on response message to the MS 500 in step 521. Whether to allow the usage resumption of the suspended S-FA is determined based on the load of the suspended S-FA, and the existence and the number of MSs which use the suspended S-FA as their P-FA. The S-FA on response message includes one of the information informing of the permission on the resumption of the suspended S-FA of the MS 500, the information informing of the disapproval of the resumption of the suspended S-FA of the MS 500, and the information requesting to use other FA than the suspended S-FA. To direct to use the other FA, the BS 550 adds frequency information or FA identifier information of the other FA to the S-FA on response message. Hereafter, it is assumed that the usage resumption of the S-FA1 503-1 is permitted. An S-FA readiness indicator and an S-FA readiness indicator ACK used to resume the suspended S-FA in the sleep mode may be added to one of the control message of the MAC layer defined to control the sleep mode, and the MAC layer header.

The MS 500, confirming the permission of the resumption of the suspended S-FA from the S-FA on response message, completes the preparation for the resumption of the suspended S-FA and then sends the S-FA readiness indicator in step 523. For example, the preparation for the resumption includes synchronization procedure such as ranging, hardware status transition, and so on. Herein, unlike the readiness indicators of FIGS. 2 and 3, the S-FA readiness indicator is used to inform that the resumption of the suspended S-FA may be started.

After sending the S-FA readiness indicator, the MS 500 transmits and receives data to and from the BS 550 over the P-FA 501 and the N-ary S-FAs 503-1 through 503-N in step 525.

Figure 6:
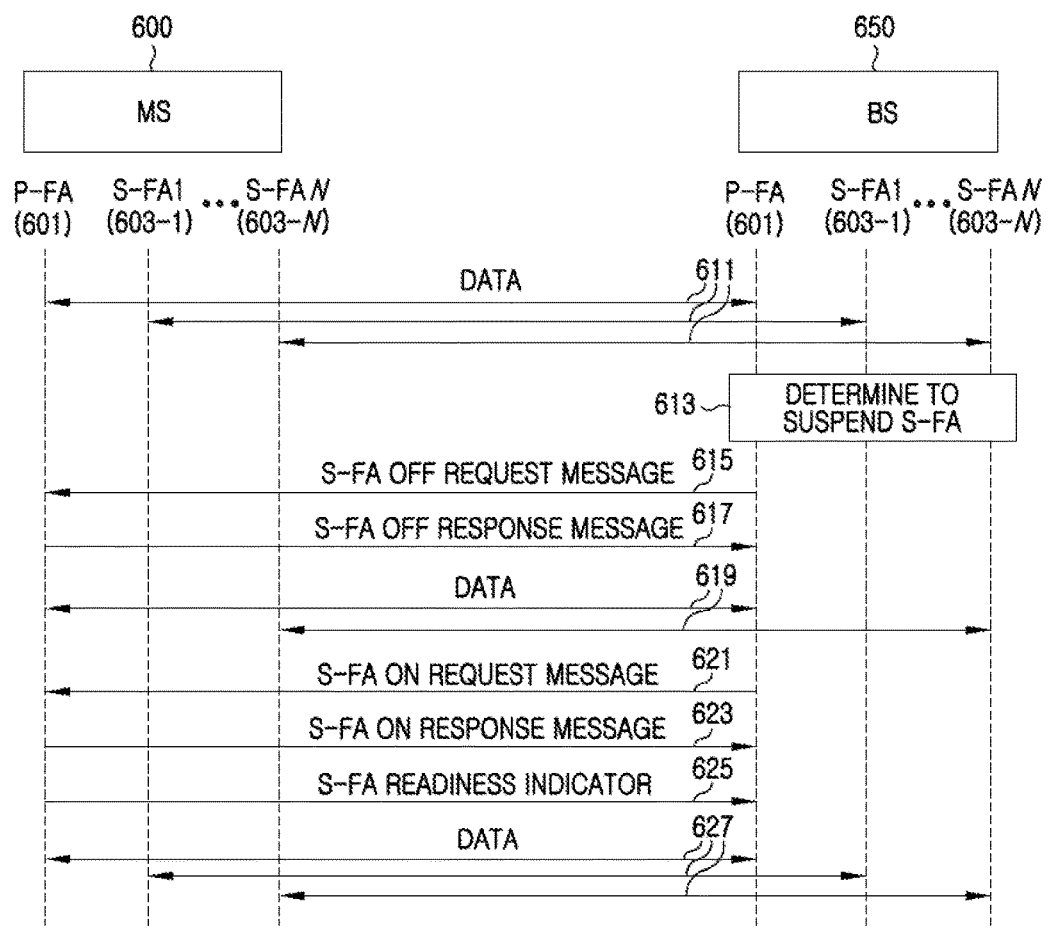
FIG. 6 is a diagram illustrating signal exchanges for S-FA on-off in a broadband wireless communication system according to an exemplary embodiment of the present invention.

FIG. 6 is a diagram illustrating signal exchanges for S-FA on-off in an overlay wireless communication system according to an exemplary embodiment of the present invention. In FIG. 6, the broadband wireless communication system includes an MS 600 and a BS 650. The MS 600 and the BS 650 employ (N+1)-ary FAs, that is, one P-FA 601 and N-ary S-FAs 603-1 through 603-N. Note that the procedures in FIG. 6 are applicable to two FAs, that is, to one P-FA and one S-FA.

Referring to FIG. 6, the MS 600 transmits and receives data to and from the BS 650 over the P-FA 601 and the N-ary S-FAs 603-1 through 603-N in step 611. Herein, the P-FA 601 is determined at the initial connection of the MS 600. Accordingly, when a plurality of MSs exists, the P-FAs of the MSs may be set to different FAs. That is, the P-FA of a particular MS may be the S-FA of another MS.

During the data communication, the BS 650 determines to suspend at least one of the N-ary S-FAs 603-1 through 603-N in step 613. The suspension of the S-FA is determined based on a signal strength measurement value of each S-FA reported from the MS 600, and the load of each S-FA. For example, when the signal strength measurement value of the corresponding S-FA is less than a threshold required for the data delivery or when the load needs to be distributed because of the excessive load in the corresponding S-FA, the BS 650 determines to suspend the usage of at least one of the N-ary S-FAs 603-1 through 603-N. Hereafter, it is assumed that the S-FA1 603-1 is suspended.

The BS 650 sends an S-FA off request message for the at least one of the N-ary S-FAs 603-1 through 603-N to the MS 600 in step 615. The S-FA off request message includes indication information of the S-FA1 603-1 requested to suspend. For example, the indication information is one of the frequency information of the S-FA1 603-1, the index of the S-FA1 603-1, and the S-FA bitmap information representing the S-FA1 603-1. Herein, the index is the physical carrier index or the logical carrier index. The bitmap size is equal to the number of the S-FAs allocated to the MS 600. When the S-FAs allocated to the MS 600 differ from the S-FAs actually used by the MS 600, the bitmap size is determined by the number of the S-FAs actually used by the MS 600 and is used to represent a particular S-FA to suspend among the S-FAs actually used by the MS 600. When able to predict the off duration of the suspended S-FA by analyzing the occurrence of downlink data, the BS 650 adds information indicative of the off duration of the suspended S-FA to the S-FA off request message. In addition, the S-FA off request message may include information requesting to use other FAs than the suspended S-FA. To direct to use the other FAs, the BS 650 adds the indication information of the other FA, for example, one of the frequency information, the index, and the bitmap to the S-FA off request message. Herein, the index is the physical carrier index or the logical carrier index. Hereafter, it is assumed that the information requesting to use the other FA is not included.

The MS 600, receiving the S-FA off request message from the BS 650, sends an S-FA off response message in reply to the S-FA off request message in step 617. Accordingly, the MS 600 and the BS 650 suspend at least one of the N-ary S-FAs 603-1 through 603-N and transmit and receive data over the other FAs excluding the suspended S-FA in step 619.

If it is determined that the resumption of the usage of the S-FA1 603-1 is necessary and that the usage resumption is feasible, the BS 650 sends an S-FA on request message requesting to resume the suspended S-FA to the MS 600 in step 621. Whether to resume the S-FA is determined based on criteria similar to the aforementioned S-FA suspension. Whether to resume the S-FA is determined based on the signal strength measurement value of each S-FA reported from the MS 600, and the load of each S-FA. For example, when a signal strength measurement value of the corresponding S-FA is greater than a threshold required for the data delivery or when the load in the corresponding S-FA is quite little and additional traffic may be accommodated, the BS 650 determines that it is possible to resume the S-FA1 603-1.

Upon receiving the S-FA on request message, the MS 600 sends an S-FA on response message to the BS 650 in reply to the S-FA on request message in step 623. Next, the MS 600 completes the preparation for the usage resumption of the suspended S-FA and then sends an S-FA readiness indicator in step 625. For example, the preparation for the usage resumption includes the synchronization procedure such as ranging, and the hardware status transition. Herein, unlike the readiness indicators of FIGS. 2 and 3, the S-FA readiness indicator is used to inform that the usage resumption of the suspended S-FA may begin.

After sending the S-FA readiness indicator, the MS 600 and the BS 650 transmit and receive data over the P-FA 601 and the N-ary S-FAs 603-1 through 603-N in step 627.

In FIG. 6, the MS 600 transmits the S-FA on response message and S-FA readiness indicator upon receiving the S-FA on request message. However, according to another exemplary embodiment of the present invention, step 625 where the MS 600 transmits the S-FA readiness indicator may is excluded, and step 623 where the MS 600 transmits the S-FA on response message is performed after completing the preparation for the usage resumption of the suspended S-FA. That is, the S-FA on response message is used to reply to the S-FA on request message and to inform that the usage resumption of the suspended S-FA may begin.

In FIG. 6, the BS sends the message for turning off the S-FA. Besides, the BS may request the suspension of the S-FA together with the request for the sleep mode entrance, which is now explained in detail by referring to FIG. 7.

Figure 7:
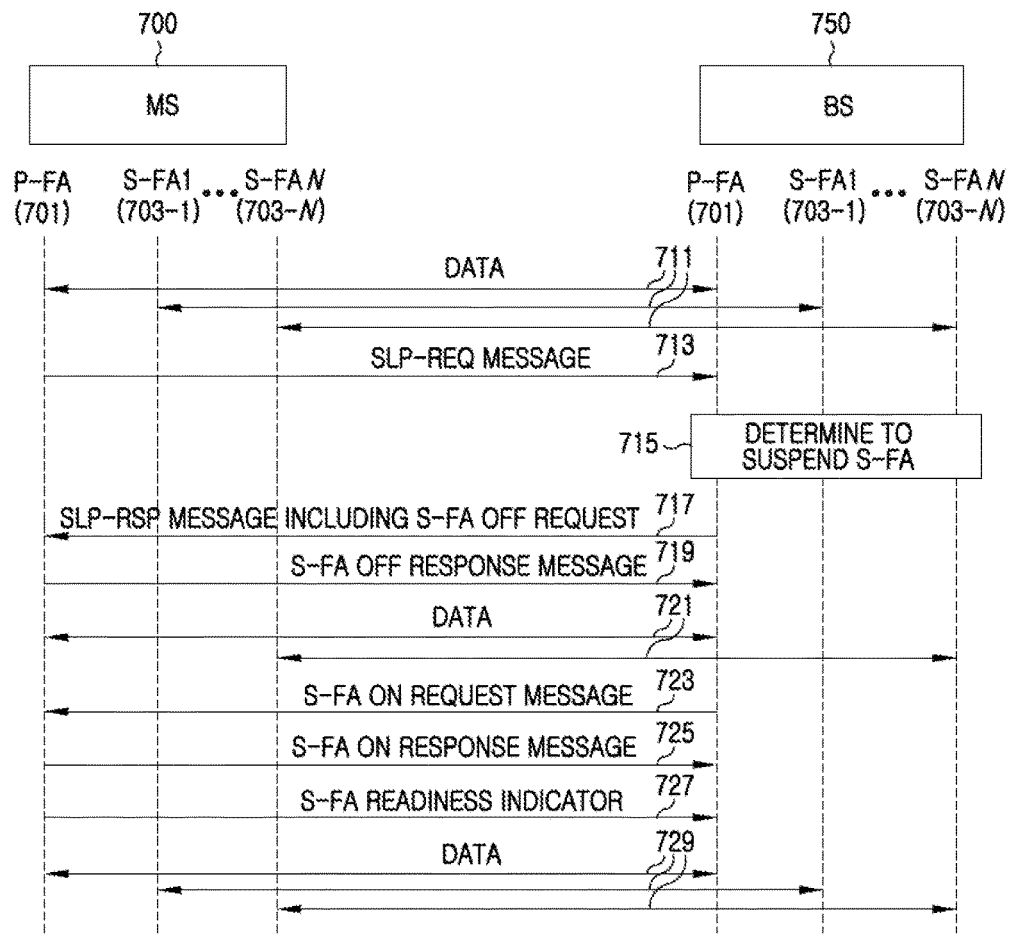
FIG. 7 is a diagram illustrating signal exchanges for S-FA on-off in a broadband wireless communication system according to an exemplary embodiment of the present invention.

FIG. 7 is a diagram illustrating signal exchanges for S-FA on-off in an overlay wireless communication system according to an exemplary embodiment of the present invention.

In FIG. 7, an MS 700 transmits and receives data to and from a BS 750 over the P-FA 701 and the N-ary S-FAs 703-1 through 703-N in step 711. Herein, the P-FA 701 is determined at the initial connection of the MS 700. Accordingly, when a plurality of MSs exists, the P-FAs of the MSs may be set to different FAs. That is, the P-FA of a particular MS may be the S-FA of another MS.

In the process of the data communication, the MS 700 determines to enter into the sleep mode and sends an SLP-REQ message to the BS 750 in step 713. The BS 750 determines to suspend at least one of the N-ary S-FAs 703-1 through 703-N in step 715. The usage suspension of the S-FA is determined based on the load of each S-FA, the signal strength measurement value of each S-FA reported from the MS 700, and so forth. For example, when a signal strength measurement value of the corresponding S-FA is less than a threshold required for the data delivery or when the load needs to be distributed because of the excessive load in the corresponding S-FA, the BS 750 determines to suspend the usage of at least one of the N-ary S-FAs 703-1 through 703-N. Hereafter, it is assumed that the S-FA1 703-1 is suspended.

Upon receiving the SLP-REQ message, the BS 750 determines whether to allow the sleep mode entrance of the MS 700 and sends an SLP-RSP message informing of the approval or the disapproval in step 717. The SLP-RSP message includes the S-FA off request which requests to suspend the S-FA1 703-1 as determined in step 715. The S-FA off request includes indication information of the S-FA1 703-1 requested to be suspended. For example, the indication information is one of the frequency information of the S-FA1 703-1, an index of the S-FA1 703-1, and the S-FA bitmap representing the S-FA1 703-1. Herein, the index is the physical carrier index or the logical carrier index. The bitmap size is equal to the number of the S-FAs allocated to the MS 700. When the S-FAs allocated to the MS 700 differ from the S-FAs actually used by the MS 700, the bitmap size is determined by the number of the S-FAs actually used by the MS 700 and is used to indicate a particular S-FA to suspend among the S-FAs actually used by the MS 700. The S-FA off request may include the off duration information of the S-FA1 703-1.

Upon receiving the S-FA off request contained in the SLP-RSP message, the MS 700 recognizes that it is necessary to suspend the S-FA1 703-1 and sends an S-FA off response message including a response for the S-FA off request to the BS 750 in step 719. Next, the MS 700 receiving the SLP-RSP message enters into the sleep mode as indicated by the SLP-RSP message, simultaneously suspends the S-FA1 703-1, and transmits and receives data with the BS 750 over the FAs excluding the S-FA1 703-1 in the listening interval of the sleep mode in step 721. While the sleep request and/or response procedures are performed in steps 713 and 717, the sleep mode entrance of the MS 700 may not be permitted. Even when the sleep mode entrance is not permitted, the S-FA off request and/or response for the S-FA1 703-1 is still valid. In this situation, the MS 700 transmits and receives data to and from the BS 750 over the other FAs excluding the S-FA1 703-1 without entering to the sleep mode.

Next, when determining that the resumption of the usage of the S-FA1 703-1 is necessary and that the usage resumption is feasible, the BS 750 sends an S-FA on request message requesting to resume the S-FA1 703-1 to the MS 600 in step 723. Whether to resume the S-FA is determined based on criteria similar to the aforementioned S-FA suspension. Whether to resume the S-FA is determined based on the signal strength measurement value of each S-FA reported from the MS 700, and the load of each S-FA. For example, when the signal strength measurement value of the corresponding S-FA is greater than a threshold required for the data delivery or when the load in the corresponding S-FA is quite little and additional traffic may be accommodated, the BS 750 determines that it is possible to resume the S-FA1 703-1.

Upon receiving the S-FA on request message, the MS 700 sends an S-FA on response message to the BS 750 in reply to the S-FA on request message in step 725. Next, the MS 700 completes the preparation for the usage resumption of the suspended S-FA and then sends an S-FA readiness indicator in step 727. For example, the preparation for the usage resumption includes the synchronization procedure such as ranging, and the hardware status transition. Herein, unlike the readiness indicators of FIGS. 2 and 3, the S-FA readiness indicator is used to inform that the usage resumption of the suspended S-FA may begin. The S-FA readiness indicator and an S-FA readiness indicator ACK used to resume the suspended S-FA in the sleep mode may be added to one of the control message of the MAC layer defined to control the sleep mode, and the MAC layer header.

After sending the S-FA readiness indicator, the MS 700 and the BS 750 transmit and receive data over the P-FA 701 and the N-ary S-FAs 703-1 through 703-N in step 729.

In FIG. 7, the MS 700 transmits the S-FA on response message and S-FA readiness indicator upon receiving the S-FA on request message. However, according to another exemplary embodiment of the present invention, step 727 where the MS 700 transmits the S-FA readiness indicator may is excluded, and step 725 where the MS 700 transmits the S-FA on response message is performed after completing the preparation for the usage resumption of the suspended S-FA. That is, the S-FA on response message is used to reply to the S-FA on request message and to inform that the usage resumption of the suspended S-FA may begin.

In FIGS. 2 through 7, it is assumed that the off state of the S-FA does not affect Quality of Service (QoS) policy for the MS. In a case where the S-FA off operation of the MS affects the QoS policy, the MS and the BS need to additionally perform a dynamic service negotiation procedure, for example, a Dynamic Service Change (DSC) procedure. In other words, even when the off state of the S-FA decreases the available radio resources, the MS and the BS have to modify QoS parameters of the ongoing service flow so as to meet the required QoS according to the QoS policy.

In this case, the procedures of transmitting and receiving the S-FA on request message and the S-FA on response message in FIGS. 4 through 7 may be included to the dynamic service negotiation procedure. That is, by including the contents of the S-FA on request message and the S-FA on response message to the message transmitted and received for the dynamic service negotiation procedure, the MS and the BS may process the dynamic service negotiation procedure and the S-FA usage resumption procedure as a single procedure.

Now, structures and operations of the MS and the BS for turning on/off the S-FA as stated above are elucidated by referring to the drawings.

Figure 8:
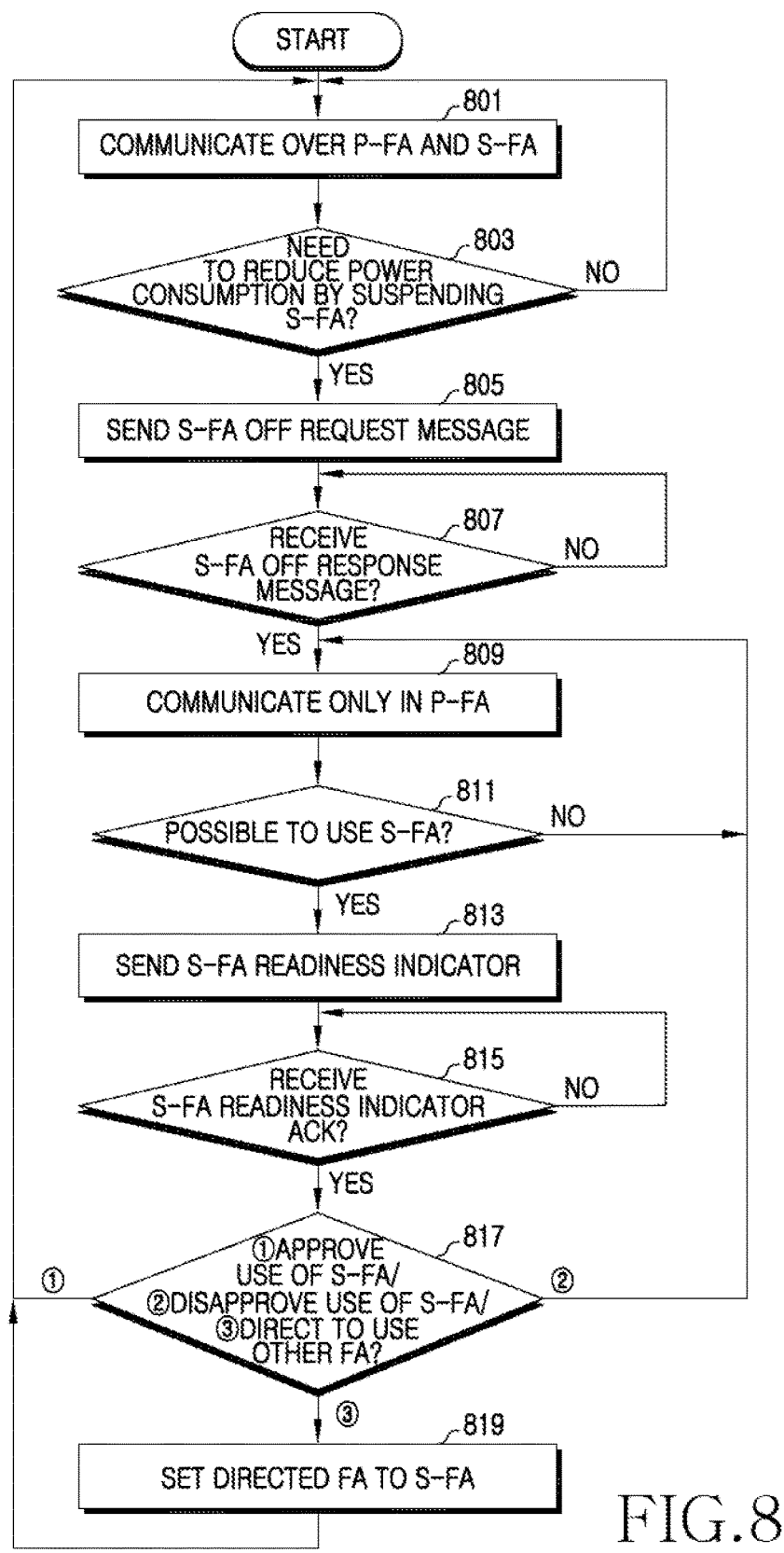
FIG. 8 is a flowchart illustrating operations of a Mobile Station (MS) in a broadband wireless communication system according to an exemplary embodiment of the present invention.

FIG. 8 is a flowchart illustrating operations of an MS in a broadband wireless communication system according to an exemplary embodiment of the present invention.

In step 801, the MS communicates over the P-FA and at least one S-FA. That is, the MS transmits and receives data to and from the BS using all of the multiple FAs.

In step 803, the MS determines whether it is necessary to reduce the power consumption by stopping using the S-FA. More specifically, the MS continuously monitors its battery status and determines based on the battery status whether to reduce the power consumption. For instance, if it is determined that the remaining capacity of the battery falls below the threshold, the MS determines to reduce the power consumption. To the contrary, when the signal strength measurement value for the S-FA is less than threshold required for the data delivery, the MS may determine that the suspension of the corresponding S-FA is required. When the suspension of the S-FA is unnecessary, the MS returns back to step 801.

When the suspension of the S-FA is required, the MS sends an S-FA off request message to the BS in step 805. The S-FA off request message includes the indication information of the S-FA requested to suspend. For example, the indication information is one of the frequency information of the S-FA, the index of the S-FA, and the S-FA bitmap representing the S-FA. Herein, the index is the physical carrier index or the logical carrier index. When able to predict the off duration of the S-FA by analyzing the occurrence of the uplink data, the MS sends the S-FA off request message including the off duration information.

In step 807, the MS determines whether the S-FA off response message is received from the BS. Herein, the S-FA off response message includes the indicator indicative of the approval or the disapproval on the usage suspension request of the S-FA.

In step 809, the MS communicates only over the P-FA. When using two or more S-FAs, the MS communicates over the other S-FAs than the suspended S-FA and the P-FA. In more detail, the MS confirms the approval of its S-FA suspension request from the S-FA off response message, and recognizes that no data is received over the suspended S-FA. Thus, the MS does not operate to maintain the synchronization for the suspended S-FA and to receive the control message in the suspended S-FA.

In step 811, the MS determines whether the use of the suspended S-FA may be resumed. Namely, the MS determines whether the usage of the suspended S-FA is resumed, based on the battery status or the signal strength measurement value. The MS determines whether the remaining battery capacity is enough to accommodate the power consumption increased by the resumption of the suspended S-FA, or whether the signal strength measurement value of the suspended S-FA is greater than the threshold. When the suspended S-FA may not be resumed, the MS returns to step 809.

When the suspended S-FA is resumed, the MS sends an S-FA readiness indicator to the BS in step 813. Although it is not illustrated in FIG. 8, before sending the S-FA readiness indicator, the MS may perform the ranging procedure on the S-FA if necessary. For instance, when the S-FA is physically close to the P-FA, frequency/time adjustment value of the P-FA may be applied to the S-FA. By contrast, when the S-FA is not physically close to the P-FA, it is not preferable to apply the frequency/time adjustment value of the P-FA to the S-FA. Hence, the MS conducts the ranging procedure on the S-FA.

In step 815, the MS determines whether an S-FA readiness indicator ACK is received from the BS. The S-FA readiness indicator ACK informs of the determination result of the BS with respect to the S-FA usage resumption request of the MS. Herein, the determination result of the BS is one of the usage approval of the S-FA, the usage disapproval of the S-FA, and the instruction to use other FA.

When receiving the S-FA readiness indicator ACK, the MS confirms the determination result of the BS from the S-FA readiness indicator ACK in step 817. More specifically, the MS determines whether the usage of the S-FA is approved, the usage of the S-FA is disapproved, or the usage of another FA is instructed. When the usage of the S-FA is allowed, the MS returns back to step 801. When the usage of the S-FA is not allowed, the MS returns back to step 809.

When the usage of the other FA is instructed, the MS sets the other FA as its S-FA in step 819. That is, the MS determines to use the other FA as its S-FA as instructed by the BS. To set the other FA as the S-FA, the MS may perform the ranging on the other FA. Next, the MS returns to step 801.

Another exemplary implementation of the MS is now illustrated.

In step 805, the MS requests to enter into the sleep mode and to suspend the S-FA at the same time. In other words, the MS sends the SLP-REQ message including the S-FA off request. In step 807, the MS determines whether the SLP-RSP message including the S-FA off response is received. Next, the MS confirms whether the sleep mode entrance is approved, from the SLP-RSP message. Since the sleep mode entrance may not be permitted while the suspension request of the S-FA is accepted, the MS examines whether the sleep mode entrance is approved. When the sleep mode entrance is approved, the MS enters the sleep mode and communicates over at least one FA excluding the suspended S-FA in step 809. When the sleep mode entrance is not permitted, the MS communicates in at least one FA excluding the suspended FA without entering the sleep mode in step 809.

Yet another exemplary implementation of the MS is now described.

In step 813, the MS sends an S-FA on request message to the BS. In step 815, the MS determines whether an S-FA on response message is received. Herein, the S-FA on response message includes one of the information informing of the approval of the usage resumption of the suspended S-FA, the information informing of the disapproval of the usage resumption of the suspended S-FA, and the information requesting to use other FA than the suspended S-FA. When the information informing of the disapproval of the usage resumption of the suspended S-FA is included, the MS returns back to step 809. When the information requesting to use other FA is included, the MS proceeds to step 819. When the information informing of the approval of the usage resumption of the suspended S-FA is carried, the MS completes the preparation for the resumption of the suspended S-FA and sends the S-FA readiness indicator. For example, the preparation for the usage resumption includes the synchronization procedure such as ranging, and the hardware status transition.

Still another exemplary implementation of the MS is now described.

In step 805, the MS requests to enter into the sleep mode and simultaneously requests to stop using the S-FA. That is, the MS sends the SLP-REQ message including the S-FA off request. In step 807, the MS determines whether the SLP-RSP message including the S-FA off response is received. Next, based on the SLP-RSP message, the MS confirms the approval or the disapproval of the sleep mode entrance. Since the sleep mode entrance may not be approved while the S-FA suspension request is accepted, the MS confirms the approval or the disapproval of the sleep mode entrance. When the sleep mode entrance is allowed, the MS enters the sleep mode and communicates over at least one FA excluding the suspended S-FA in the listening interval in step 809. By contrast, when the sleep mode entrance is not allowed, the MS communicates over at least one FA excluding the suspended S-FA in the listening interval without entering into the sleep mode in step 809.

In step 813, the MS sends an S-FA on request message to the BS. In step 815, the MS determines whether an S-FA on response message is received. Herein, the S-FA on response message includes one of the information informing of the approval of the usage resumption of the suspended S-FA, the information informing of the disapproval of the usage resumption of the suspended S-FA, and the information requesting to use other FA than the suspended S-FA. When the information informing of the disapproval of the usage resumption of the suspended S-FA is included, the MS returns back to step 809. When the information requesting to use other FA is included, the MS proceeds to step 819. When the information informing of the approval of the usage resumption of the suspended S-FA is carried, the MS completes the preparation for the resumption of the suspended S-FA and sends the S-FA readiness indicator. For example, the preparation for the usage resumption includes the synchronization procedure such as ranging, and the hardware status transition.

Figure 9:
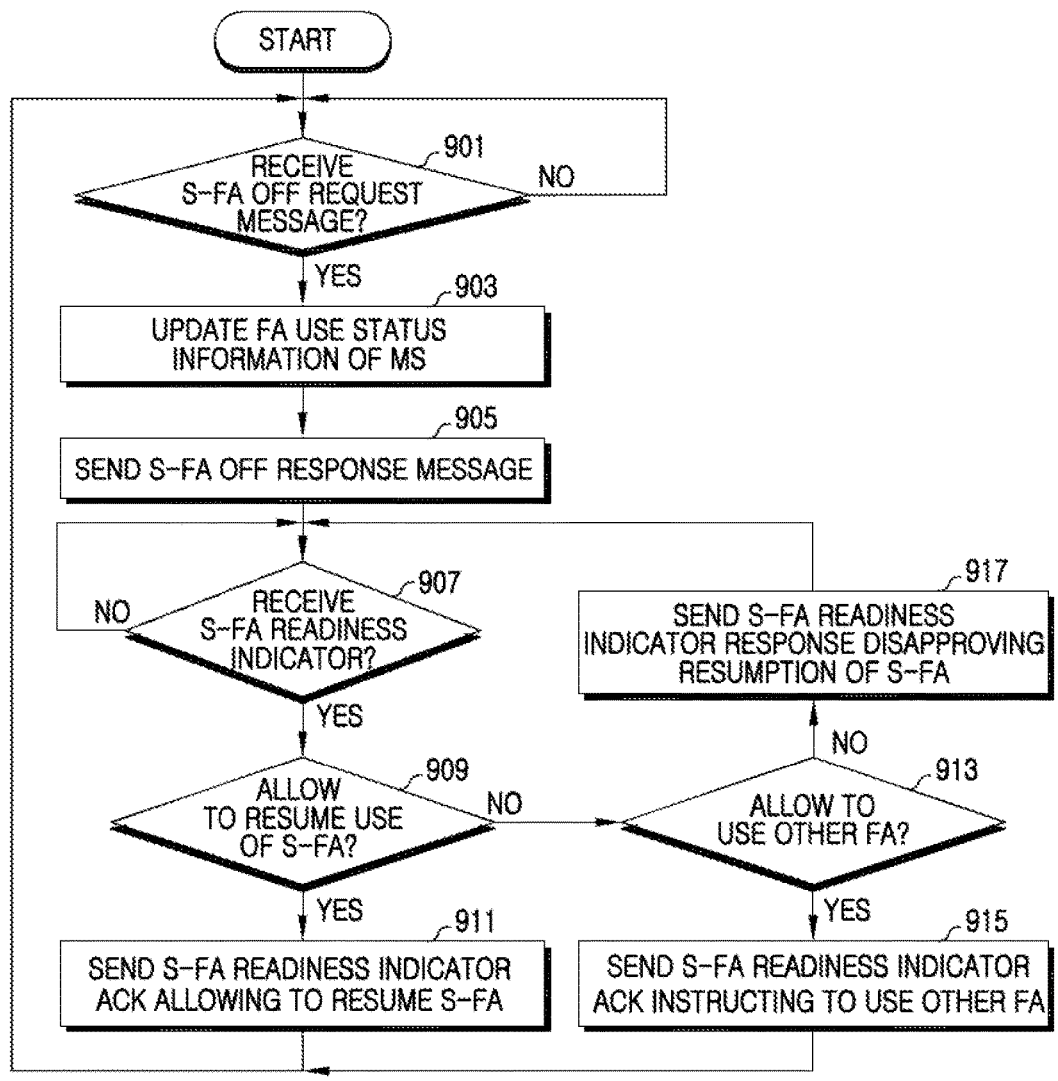
FIG. 9 is a flowchart illustrating operations of a Base Station (BS) in a broadband wireless communication system according to an exemplary embodiment of the present invention.

FIG. 9 is a flowchart illustrating operations of a BS in a broadband wireless communication system according to an exemplary embodiment of the present invention.

In step 901, the BS determines whether an S-FA off request message is received from the MS. More specifically, the BS determines whether the usage suspension of the S-FA is requested from the MS which is communicating over the P-FA and the S-FA. The S-FA off request message is received over the P-FA of the MS. The S-FA off request message includes the indication information of the S-FA requested to suspend. For example, the indication information is one of the frequency information of the S-FA, the index of the S-FA, and the S-FA bitmap representing the S-FA. Herein, the index is the physical carrier index or the logical carrier index.

Receiving the S-FA off request message, the BS updates FA use status information of the MS in step 903. By receiving the S-FA off request message, the BS determines to suspend the usage of the S-FA at the MS. Correspondingly, to reflect the suspension of the S-FA in the resource allocation, the BS excludes the S-FA from a list of the used FAs of the MS. Consequently, the resource in the S-FA is not allocated to the MS. When the S-FA off request message includes the off duration information, the BS reflects the off duration information to its scheduling.

In step 905, the BS sends an S-FA off response message to the MS. Herein, the S-FA off response message includes the indicator indicative of the approval or the disapproval of the suspension request of the S-FA.

In step 907, the BS determines whether an S-FA readiness indicator is received from the MS. That is, the BS determines whether the MS requests the resumption of the S-FA.

Upon receiving the S-FA readiness indicator, the BS determines whether the usage of the S-FA may be allowed in step 909. Herein, whether to permit the use of the S-FA is determined based on the load of the S-FA, the existence and the number of the MSs which employ the S-FA as their P-FA.

When the use of the S-FA may be allowed, the BS sends an S-FA readiness indicator ACK notifying of the approval of the S-FA usage to the MS in step 911. Next, the BS updates the FA use status information of the MS.

In contrast, when not allowing the use of the S-FA in step 909, the BS determines whether to permit the usage of other FA in step 913. The BS examines whether there exists the FA usable by the MS among the FAs except for the S-FA and the P-FA of the MS. Herein, whether to allow using the other FA is determined based on a resource usage rate of the other FA, and the existence and the number of the MSs which employ the other FA as the P-FA.

When the usage of the other FA is allowable in step 913, the BS sends the S-FA readiness indicator ACK instructing to use the other FA, to the MS in step 915. Next, the BS updates the FA use status information of the MS.

In contrast, when the usage of the other FA is not allowable in step 913, the BS sends the S-FA readiness indicator ACK notifying of the disapproval of the S-FA use in step 917.

Another exemplary implementation of the BS is now described.

The BS determines whether the SLP-REQ message is received from the MS. Upon receiving the SLP-REQ message, the BS determines whether the SLP-REQ message includes the S-FA off request in step 901. When the SLP-REQ message includes the S-FA off request, the BS proceeds to step 903. Next, the BS determines whether to allow the sleep mode entrance of the MS. In step 905, the BS sends the SLP-RSP message notifying of the approval or the disapproval of the sleep mode entrance. The SLP-RSP message includes the S-FA off response.

Yet another exemplary implementation of the BS is now described.

In step 907, the BS determines whether the S-FA on request message is received. Herein, the S-FA on request message informs of the request of the resumption of the suspended S-FA. Upon receiving the S-FA on request message, the BS proceeds to step 909. In step 911, 915 or 917, the BS sends an S-FA on response message including one of the information informing of the approval of the usage resumption of the suspended S-FA, the information informing of the disapproval of the usage resumption of the suspended S-FA, and the information requesting to use other FA than the suspended S-FA. Next, the BS determines whether the S-FA readiness indicator is received from the MS. Receiving the S-FA readiness indicator, the BS updates the FA use status information of the MS.

Still another exemplary implementation of the BS is now described.

The BS determines whether the SLP-REQ message is received from the MS. Upon receiving the SLP-REQ message, the BS determines whether the SLP-REQ message includes the S-FA off request in step 901. When the SLP-REQ message includes the S-FA off request, the BS proceeds to step 903. Next, the BS determines whether to allow the sleep mode entrance of the MS. In step 905, the BS sends the SLP-RSP message informing of the approval or the disapproval of the sleep mode entrance. The SLP-RSP message includes the S-FA off response.

In step 907, the BS determines whether the S-FA on request message is received. Herein, the S-FA on request message informs of the request to resume the suspended S-FA. When receiving the S-FA on request message, the BS proceeds to step 909. In step 911, 915 or 917, the BS sends an S-FA on response message including one of the information informing of the approval of the usage resumption of the suspended S-FA, the information informing of the disapproval of the usage resumption of the suspended S-FA, and the information requesting to use other FA than the suspended S-FA. Next, the BS determines whether the S-FA readiness indicator is received from the MS. Receiving the S-FA readiness indicator, the BS updates the FA use status information of the MS.

Figure 10:
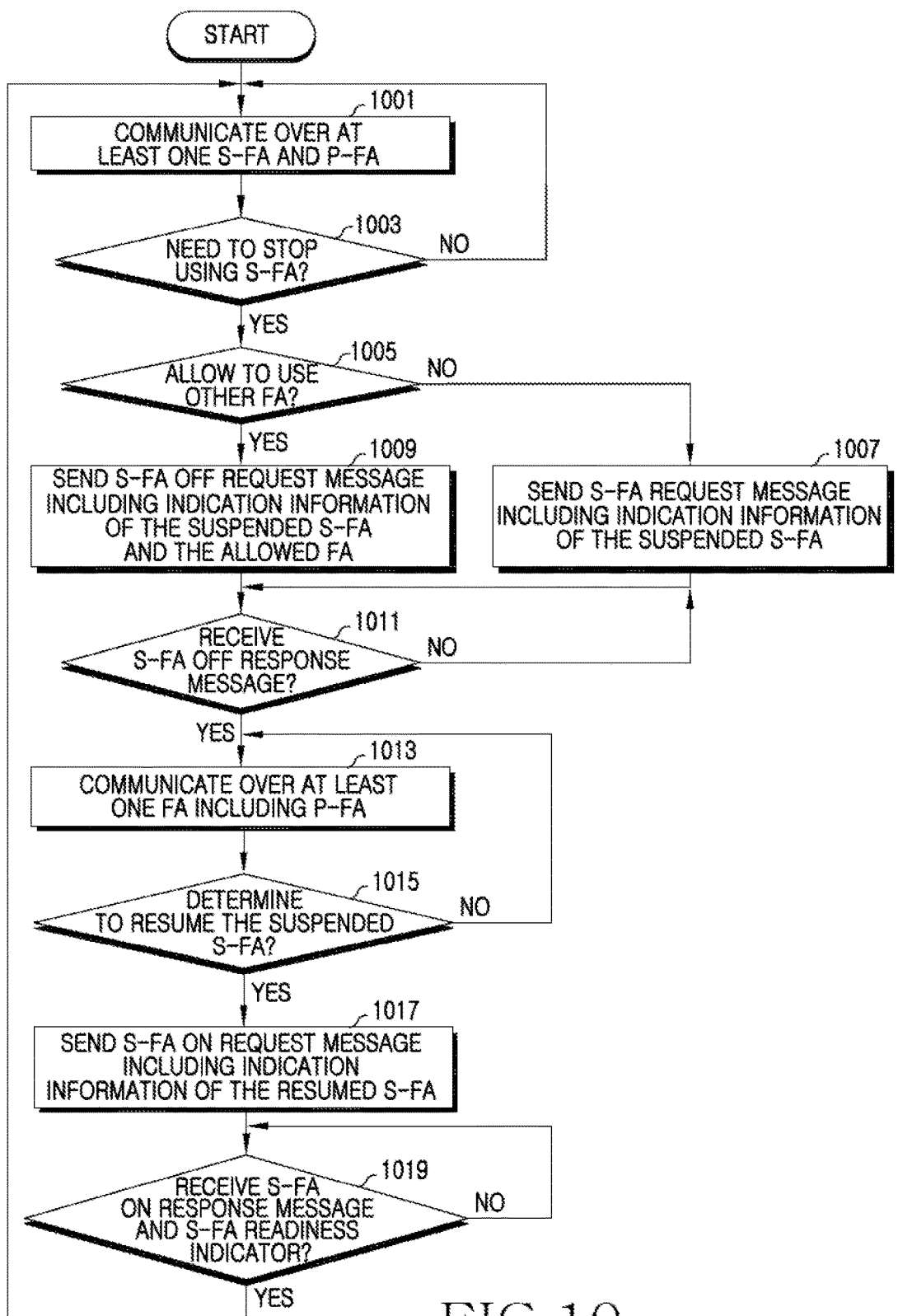
FIG. 10 is a flowchart illustrating operations of a BS in a broadband wireless communication system according to an exemplary embodiment of the present invention.

FIG. 10 is a flowchart illustrating operations of a BS in a broadband wireless communication system according to an exemplary embodiment of the present invention.

In step 1001, the BS communicates with the MS over the P-FA and at least one S-FA. That is, the BS transmits and receives data to and from the MS using all of the multiple FAs.

In step 1003, the BS determines whether to need to suspend the use of at least one S-FA. The suspension of the at least one S-FA is determined based on a signal strength measurement value of each S-FA reported from the MS, and the load of each S-FA. For example, when the signal strength measurement value of the corresponding S-FA is less than a threshold required for the data delivery or when the load needs to be distributed because of the excessive load in the corresponding S-FA, the BS determines to suspend the usage of at least one S-FA. In so doing, the subject of the suspension is all or part of the at least one S-FA.

When determining to suspend the use of the at least one S-FA, the BS determines whether it is possible to allow using other FA in step 1005. In other words, the BS determines whether a new FA may be allocated in place of the suspended S-FA.

When the use of the other FA is not allowable, the BS sends the S-FA request message including the indication information of the suspended S-FA in step 1007. By contrast, when the use of the other FA is allowable, the BS sends the S-FA request message including the indication information of the suspended S-FA and the newly allowed FA in step 1009. For example, the indication information is one of the frequency information of the corresponding FA, the index, and the S-FA bitmap representing the corresponding FA. Herein, the index is the physical carrier index or the logical carrier index. When the BS is able to predict the off duration of the suspended S-FA by analyzing the occurrence of the downlink data, the BS adds the information indicative of the off duration to the S-FA off request message.

In step 1011, the BS determines whether an S-FA off response message is received from the MS. The BS determines whether the MS receives the use suspension instruction of the S-FA.

Receiving the S-FA off response message, the BS communicates over one or more FAs including the P-FA in step 1013. Namely, the BS communicates over the at least one FA except for the suspended S-FA.

In step 1015, the BS determines whether the usage resumption of the suspended S-FA is determined. The BS determines whether the usage resumption of the suspended S-FA is necessary and whether the usage resumption is feasible. Whether the usage resumption of the S-FA is feasible is determined based on the criteria similar to the aforementioned S-FA usage suspension. Whether it is possible to resume the S-FA is determined based on the signal strength measurement value of each S-FA reported from the MS, and the load of each S-FA. For example, when the signal strength measurement value of the corresponding S-FA is greater than the threshold required for the data delivery or when the load in the corresponding S-FA is quite little and additional traffic may be accommodated, the BS determines that it is possible to resume the S-FA.

Upon determining to resume the suspended S-FA, the BS sends an S-FA on request message including the indication information of the resumed S-FA in step 1017. For example, the indication information is one of the frequency information of the corresponding FA, the index, and the S-FA bitmap representing the corresponding FA. Herein, the index is the physical carrier index or the logical carrier index.

In step 1019, the BS determines whether the S-FA on response message and an S-FA readiness indicator are received from the MS in sequence. Herein, the S-FA on response message notifies of the reception of the S-FA on request and the S-FA readiness indicator notifies of the readiness for the resumption of the S-FA. Hence, the BS confirms from the S-FA on response message that the MS received the S-FA on request, confirms the readiness for the resumption of the S-FA based on the S-FA readiness indicator, and then returns back to step 1001.

Another exemplary implementation of the BS is now described.

In the communication over the P-FA and the at least one S-FA in step 1001, upon receiving the SLP-REQ message from the MS, the BS determines whether to permit the sleep mode entrance of the MS. In step 1003, the BS determines whether it is necessary to suspend the usage of the at least one S-FA. Upon determining to suspend the at least one S-FA, the BS sends the SLP-RSP message informing of the approval or the disapproval of the sleep mode entrance in step 1007 or step 1009. At this time, the SLP-RSP message includes the S-FA off request. The S-FA off request includes the indication information of at least one of the suspended S-FA and the permitted FA. For example, the indication information is one of the frequency information of the corresponding FA, the index, and the S-FA bitmap representing the corresponding FA. The index is the physical carrier index or the logical carrier index. When able to predict the off duration of the suspended S-FA by analyzing the occurrence of downlink data, the BS adds the information indicative of the off duration to the S-FA off request message. Next, the BS proceeds to step 1011.

Referring FIG. 10, the BS returns to step 1001 from step 1019 when the S-FA on response message and an S-FA readiness indicator are received from the MS. However, according to another exemplary embodiment of the present invention, the S-FA readiness indicator is not considered. In this case, in step 1019, if the S-FA on response message is received from the MS, then the BS returns to step 1001. That is, the S-FA on response message is used to reply to the S-FA on request message and to inform that the usage resumption of the suspended S-FA may begin.

Figure 11:
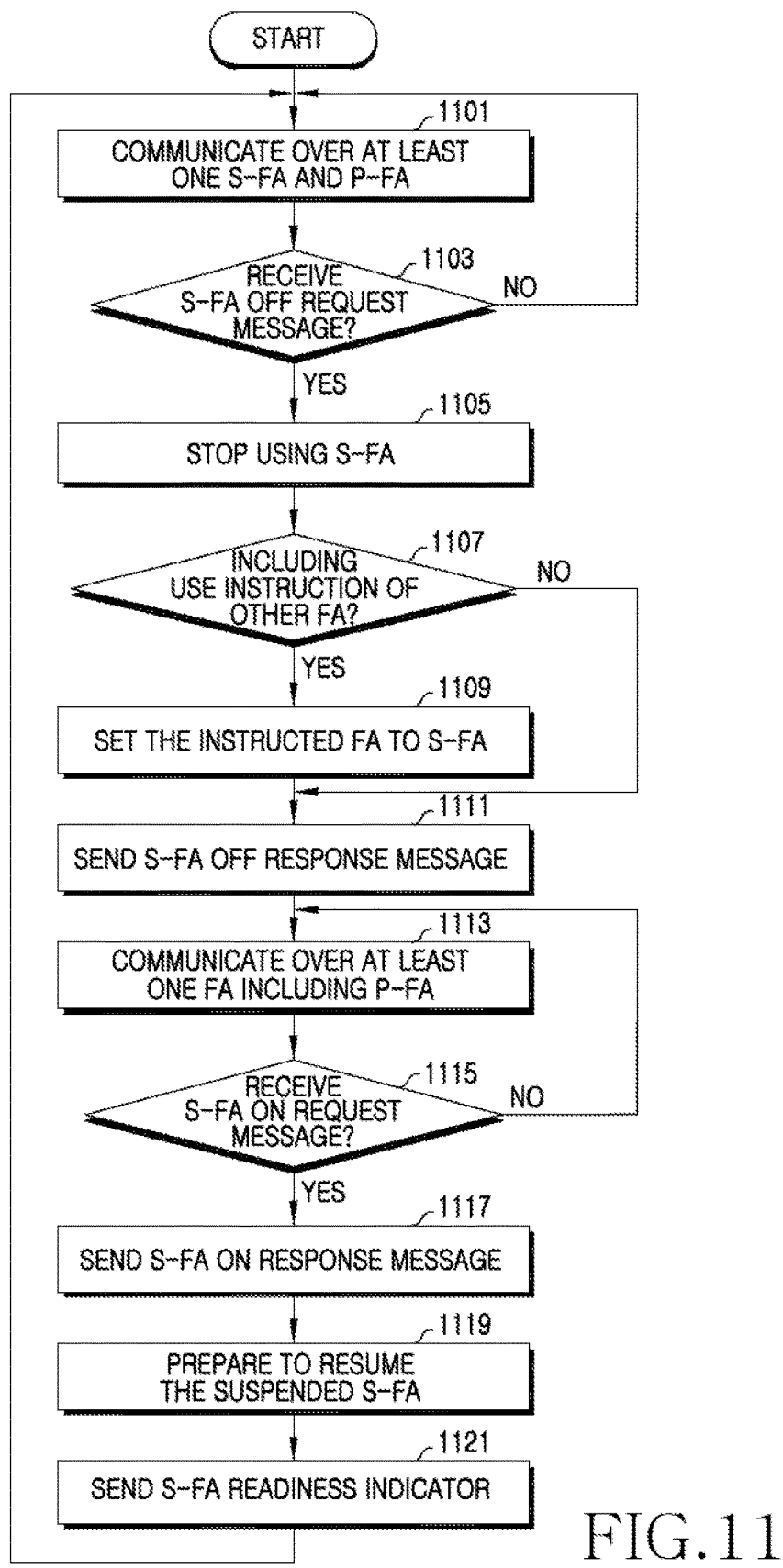
FIG. 11 is a flowchart illustrating operations of an MS in a broadband wireless communication system according to an exemplary embodiment of the present invention.

FIG. 11 is a flowchart illustrating operations of an MS in a broadband wireless communication system according to an exemplary embodiment of the present invention.

In step 1101, the MS communicates with the BS over the P-FA and at least one S-FA. Namely, the MS transmits and receives data to and from the BS using all of the multiple FAs.

In step 1103, the MS determines whether the S-FA off request message is received from the BS. The S-FA off request message directs to suspend the use of all or part of the at least one S-FA, and includes indication information of at least one of the suspended S-FA and the newly allowed FA. For example, the indication information is one of the frequency information of the corresponding FA, the index, and the S-FA bitmap representing the corresponding FA. Herein, the index is the physical carrier index or the logical carrier index. In addition, the S-FA off request may carry the information indicative of the off duration of the suspended S-FA.

Upon receiving the S-FA off request message, the MS stops using the S-FA indicated by the S-FA off request message in step 1105. That is, the MS does not maintain the synchronization for the suspended S-FA and receive the control message over the suspended S-FA.

In step 1107, the MS determines whether the S-FA off request message includes the use instruction of the other FA. The MS determines whether the S-FA off request message includes the indication information of the newly allowed FA. When the use instruction of the other FA is not contained, the MS proceeds to step 1111.

When the use instruction of the other FA is contained, the MS sets the other FA as its S-FA in step 1109. That is, the MS determines to utilize the other FA as the S-FA as instructed by the BS. To set the other FA to the S-FA, the MS may perform the ranging on the other FA.

In step 1111, the MS sends an S-FA off response message to the BS. Accordingly, the BS may acquire that the MS received the S-FA off request.

In step 1113, the MS communicates over one or more FAs including the P-FA. The MS communicates over at least one FA excluding the suspended S-FA.

In step 1115, the MS determines whether the S-FA on request message is received from the BS. The S-FA on request message requests to resume the use of the suspended S-FA and includes the indication information of the suspended S-FA. For example, the indication information is the frequency information of the corresponding FA, the index, and the S-FA bitmap representing the corresponding FA. Herein, the index is the physical carrier index or the logical carrier index.

Receiving the S-FA on request message, the MS sends an S-FA on response message to the BS in step 1117. Thus, the BS acquires that the MS received the S-FA on request.

In contrast, if it is determined that the S-FA on request message is not received from the BS in step 1115, the MS returns to step 1113.

In step 1119, the MS prepares for the usage resumption of the suspended S-FA. For example, the preparation for the usage resumption includes the synchronization procedure such as ranging, and the hardware status transition.

In step 1121, the MS sends the S-FA readiness indicator. Herein, an S-FA readiness indicator notifies that the use resumption of the suspended S-FA may be commenced. After sending the S-FA readiness indicator, the MS returns to step 1101.

Another exemplary implementation of the MS is now described.

While communicating over the P-FA and one or more S-FAs in step 1101, the MS determines to enter into the sleep mode and sends the SLP-REQ message to the BS. Next, upon receiving the SLP-RSP message from the BS, the MS determines whether the sleep mode entrance is permitted. In step 1103, the MS determines whether the SLP-RSP message includes the S-FA off request. The S-FA off request directs to stop using all or part of the one or more S-FAs and includes the indication information of at least one of the suspended S-FA and the newly allowed FA. For example, the indication information is one of the frequency information of the corresponding FA, the index, and the S-FA bitmap representing the corresponding S-FA. Herein, the index is the physical carrier index or the logical carrier index. In addition, the S-FA off request may include the information indicative of the off duration of the suspended S-FA.

Referring FIG. 11, the MS transmits the S-FA on response message in step 1117, prepares to resume the suspended S-FA in step 1119 and transmits the S-FA readiness indicator. However, according to another exemplary embodiment of the present invention, the step 1121 where the MS transmits the S-FA readiness indicator may is excluded, and step 1117 where the MS 700 transmits the S-FA on response message is performed after step 1119 where completing the preparation for the usage resumption of the suspended S-FA. That is, the S-FA on response message is used to reply to the S-FA on request message and to inform that the usage resumption of the suspended S-FA may begin.

Referring FIG. 11, the MS transmits the S-FA off response message in step 1111 after stopping the use of the S-FA or setting the other FA as its S-FA. However, according to another exemplary embodiment of the present invention, the step 1111 where the MS transmits the S-FA off response message is performed before step 1105 where the MS stops using the S-FA. That is, upon receiving the S-FA off request message, the MS transmit the S-FA off response message before stopping the use of the S-FA.

Figure 12:
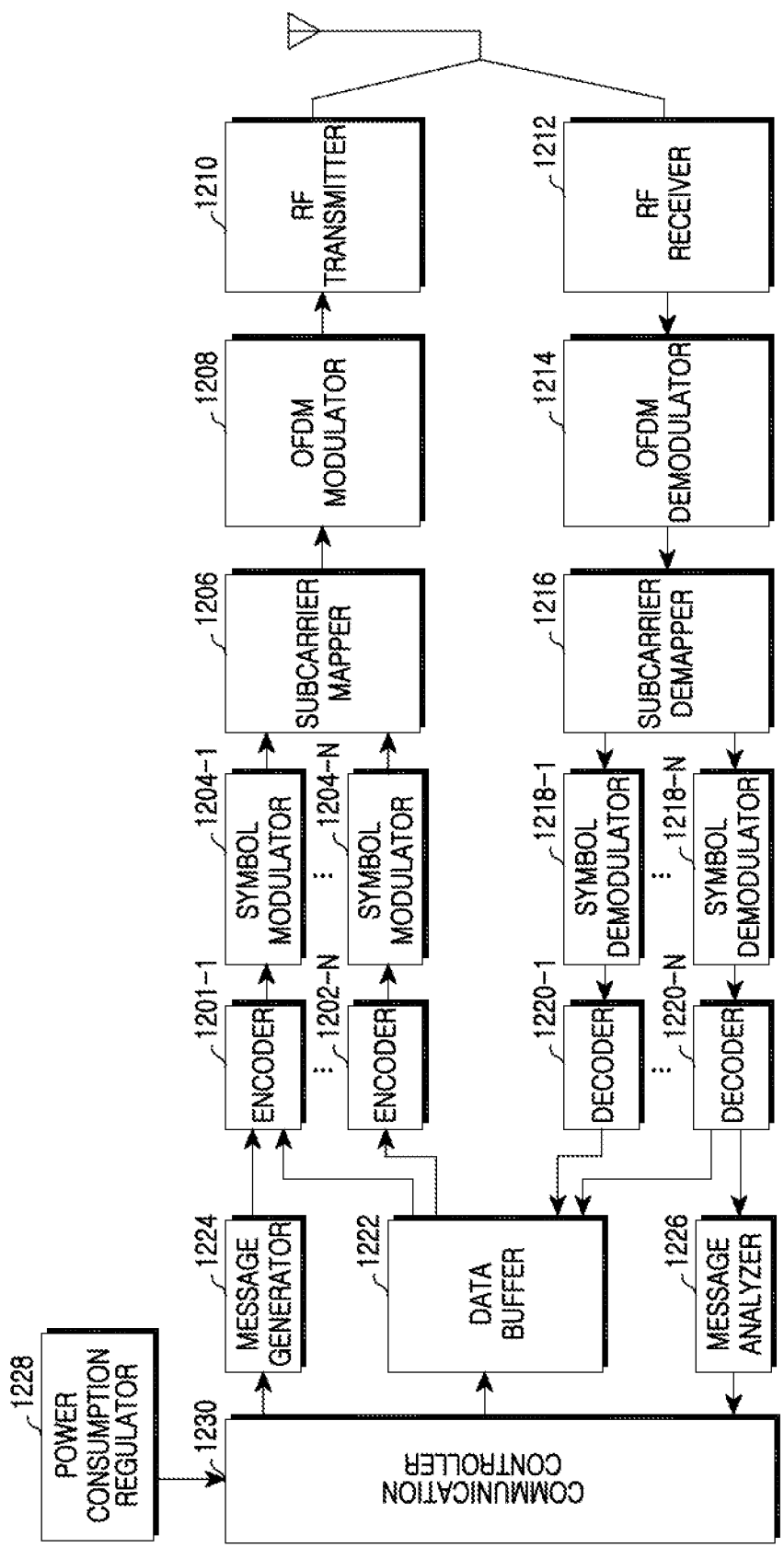
FIG. 12 is a block diagram illustrating an MS in a wireless communication system according to an exemplary embodiment of the present invention.

FIG. 12 is a block diagram illustrating an MS in a wireless communication system according to an exemplary embodiment of the present invention.

The MS of FIG. 12 includes a plurality of encoders 1202-1 through 1202-N, a plurality of symbol modulators 1204-1 through 1204-N, a subcarrier mapper 1206, an OFDM modulator 1208, a Radio Frequency (RF) transmitter 1210, an RF receiver 1212, an OFDM demodulator 1214, a subcarrier demapper 1216, a plurality of symbol demodulators 1218-1 through 1218-N, a plurality of decoders 1220-1 through 1220-N, a data buffer 1222, a message generator 1224, a message analyzer 1226, a power consumption regulator 1228, and a communication controller 1230.

The encoders 1202-1 through 1202-N each encode a data bit stream transmitted over the respective FAs. The symbol modulators 1204-1 through 1204-N modulate the encoded bit stream to transmit over the respective FAs and convert to complex symbols. The subcarrier mapper 1206 maps the complex symbols output from the symbol modulators 1204-1 through 1204-N into the frequency domain. Since the symbol modulators 1204-1 through 1204-N correspond to the FAs respectively, the subcarrier mapper 1206 maps the complex symbols output from the symbol modulators 1204-1 through 1204-N to the frequency region of the multiple FAs. The OFDM modulator 1208 converts the complex symbols mapped to the frequency domain to time-domain signals using an Inverse Fast Fourier Transform (IFFT) operation, and constitutes OFDM symbols by inserting a Cyclic Prefix (CP). The RF transmitter 1210 up-converts the OFDM symbols to an RF signal and transmits the RF signal via an antenna.

The RF receiver 1212 down-converts an RF signal received via the antenna to a baseband signal. The OFDM demodulator 1214 divides the baseband signal output from the RF receiver 1212 on the OFDM symbol basis, eliminates the CP, and restores the frequency-domain complex symbols using a Fast Fourier Transform (FFT) operation. The subcarrier demapper 1216 extracts the complex symbols mapped to the allocated resource from the frequency-domain complex symbols. The subcarrier demapper 1216 divides the complex symbols on the FA basis and distributes the complex symbols to the symbol demodulators 1218-1 through 1218-N. The symbol demodulators 1218-1 through 1218-N each demodulate and convert the complex symbols to the encoded bit stream. The decoders 1220-1 through 1220-N each decode the encoded bit stream. The data buffer 1222 temporarily stores the data exchanged with the BS and outputs the stored data under the control of the communication controller 1230.

The message generator 1224 generates a control message to send to the BS. For example, the message generator 1224 generates at least one of the S-FA off request message to request to stop using the S-FA, the SLP-REQ message including the S-FA off request, an S-FA readiness indicator to request to use the suspended S-FA, the S-FA on request message to request to use the suspended S-FA, the S-FA readiness indicator informing that the usage resumption of the suspended S-FA may start, the S-FA off response message notifying of the reception of the S-FA off request, and the S-FA on response message notifying of the reception of the S-FA on request. When generating one of the S-FA off request message, the SLP-REQ message including the S-FA off request, and the S-FA on request message, the message generator 1224 may add the indication information and the off duration information of the suspended S-FA. For example, the indication information is one of the frequency information of the corresponding FA, the index, and the S-FA bitmap representing the corresponding FA. Herein, the index is either the physical carrier index or the logical carrier index.

The message analyzer 1226 analyzes the control message received from the BS and provides the information obtained from the control message to the communication controller 1230. For instance, the message analyzer 1226 analyzes at least one of an S-FA off response message, an SLP-RSP message including the S-FA off response, an S-FA readiness indicator ACK, the S-FA on response message, an S-FA off request message, the S-FA on request message, and the SLP-RSP message including the S-FA off request message. More particularly, as analyzing one of the S-FA readiness indicator ACK and the S-FA on response message, the message analyzer 1226 attains the determination result of the BS including at least one of the approval of the usage resumption of the suspended S-FA, the disapproval of the usage resumption of the suspended S-FA, and the allowance of the new FA usage. As analyzing one of the S-FA off request message and the SLP-RSP message including the S-FA off request, the message analyzer 1226 acquires at least one of the use suspension request of the S-FA and the allowance of the other FA usage.

The power consumption regulator 1228 monitors the battery status of the MS. The power consumption regulator 1228 determines whether to reduce the power consumption based on the battery status. For instance, when the remaining battery capacity falls below the threshold, the power consumption regulator 1228 determines to reduce the power consumption. Hence, the power consumption regulator 1228 determines to stop using the S-FA or to reduce the power consumption in other manners. According to the battery status, the power consumption regulator 1228 determines whether to resume the use of the suspended S-FA. Determining to reduce the power consumption by turning off the S-FA or determining to resume the use of the suspended S-FA, the power consumption regulator 1228 informs the communication controller 1230 of its determination.

The communication controller 1230 controls the functions for the communication of the MS. More particularly, the communication controller 1230 controls the operations and the signalings for the suspension and the resumption of the S-FA usage. The detailed operations of the communication controller 1230 are now described in the various embodiments of the present invention.

In an exemplary implementation, when the power consumption regulator 1228 notifies of the necessity of the power consumption reduction by suspending the use of the S-FA, the communication controller 1230 controls the message generator 1224 to generate the S-FA off request message. Meanwhile, when the signal strength measurement value of the corresponding S-FA is less than the threshold required for the data delivery, the communication controller 1230 itself determines the necessity of the usage suspension of the S-FA and controls the message generator 1224 to generate the S-FA off request message. The S-FA off request message is transmitted to the BS through the encoders 1202-1 through 1202-N, the symbol modulators 1204-1 through 1204-N, the subcarrier mapper 1206, the OFDM modulator 1208, and the RF transmitter 1210. Next, when the message analyzer 1226 confirms the S-FA off response message, the communication controller 1230 controls to communicate over at least one S-FA excluding the suspended S-FA. Determining that the usage of the suspended S-FA may be resumed, the communication controller 1230 controls the message generator 1224 to generate the S-FA readiness indicator. Herein, the usage resumption of the suspended S-FA is determined by the battery status or the signal intensity measurement value notified from the power consumption regulator 1228. Before controlling to generate the S-FA readiness indicator, the communication controller 1230 may perform the ranging procedure on the suspended S-FA. When the message analyzer 1226 receives the S-FA readiness indicator ACK and confirms the determination result of the BS, the communication controller 1230 controls the MS to operate according to the determination result.

In an exemplary implementation, notably, when determining the necessity of the sleep mode entrance and the usage suspension of the S-FA, the communication controller 1230 controls the message generator 1224 to generate the SLP-REQ message including the S-FA off request. When the message analyzer 1226 confirms the SLP-RSP message including the S-FA off response, the communication controller 1230 controls to communicate in at least one S-FA excluding the suspended S-FA, and the P-FA.

In an exemplary implementation, notably, when determining that the use of the suspended S-FA may be resumed, the communication controller 1230 controls the message generator 1224 to generate the S-FA on request message. Next, when the message analyzer 1226 receives the S-FA on response message and confirms the determination result of the BS, the communication controller 1230 controls the functions of the MS to operate according to the determination result. When the usage resumption of the suspended S-FA is allowed, the communication controller 1230 completes the preparation for the use resumption of the suspended S-FA, and controls the message generator 1224 to generate the S-FA readiness indicator. By way of example, the preparation for the use resumption includes the synchronization procedure such as ranging, and the hardware status transition.

In an exemplary implementation, distinctively, when determining the necessity of the sleep mode entrance and the usage suspension of the S-FA, the communication controller 1230 controls the message generator 1224 to generate the SLP-REQ message including the S-FA off request. When the message analyzer 1226 confirms the SLP-RSP message including the S-FA off response, the communication controller 1230 controls to communicate in at least one S-FA excluding the suspended S-FA, and the P-FA. When determining that the use of the suspended S-FA may be resumed, the communication controller 1230 controls the message generator 1224 to generate the S-FA on request message. Next, when the message analyzer 1226 confirms the reception of the S-FA on response message and the determination result of the BS, the communication controller 1230 controls the functions of the MS to operate according to the determination result. In so doing, when the use resumption of the suspended S-FA is allowed, the communication controller 1230 completes the preparation for the use resumption of the suspended S-FA, and then controls the message generator 1224 to generate the S-FA readiness indicator. For example, the preparation for the use resumption includes the synchronization procedure such as ranging, and the hardware status transition.

In an exemplary implementation, when the message analyzer 1226 confirms the S-FA off request message from the BS, the communication controller 1230 stops using the S-FA indicated by the S-FA off request message. When the S-FA off request message includes the use instruction of the other FA, the communication controller 1230 sets the other FA to its S-FA. To define the other FA as the S-FA, the communication controller 1230 may perform the ranging on the other FA. Next, the communication controller 1230 controls the message generator 1224 to generate the S-FA off response message. The S-FA off response message is transmitted to the BS through the encoders 1202-1 through 1202-N, the symbol modulators 1204-1 through 1204-N, the subcarrier mapper 1206, the OFDM modulator 1208, and the RF transmitter 1210. Next, the communication controller 1230 controls to communicate over at least one FA except for the suspended S-FA. When the message analyzer 1226 confirms the S-FA on request message from the BS, the communication controller 1230 controls the message generator 1224 to generate the S-FA on response message, and prepares for the usage resumption of the suspended S-FA. For example, the preparation for the use resumption includes the synchronization procedure such as ranging, and the hardware status transition. After getting ready to resume the suspended S-FA, the communication controller 1230 controls the message generator 1224 to generate the S-FA readiness indicator. Herein, the S-FA readiness indicator notifies that the resumption of the suspended S-FA may begin.

In an exemplary implementation, distinctively, when the entrance into the sleep mode is determined, the communication controller 1230 controls the message generator 1224 to generate the SLP-REQ message. When the message analyzer 1226 confirms the SLP-RSP message, the communication controller 1230 confirms the approval or the disapproval of the sleep mode entrance and determines whether the SLP-RSP message includes the S-FA off request. When the S-FA off request is contained, the communication controller 1230 operates the same as in the case where the S-FA off request message is received in the further exemplary embodiment of the present invention.

Figure 13:
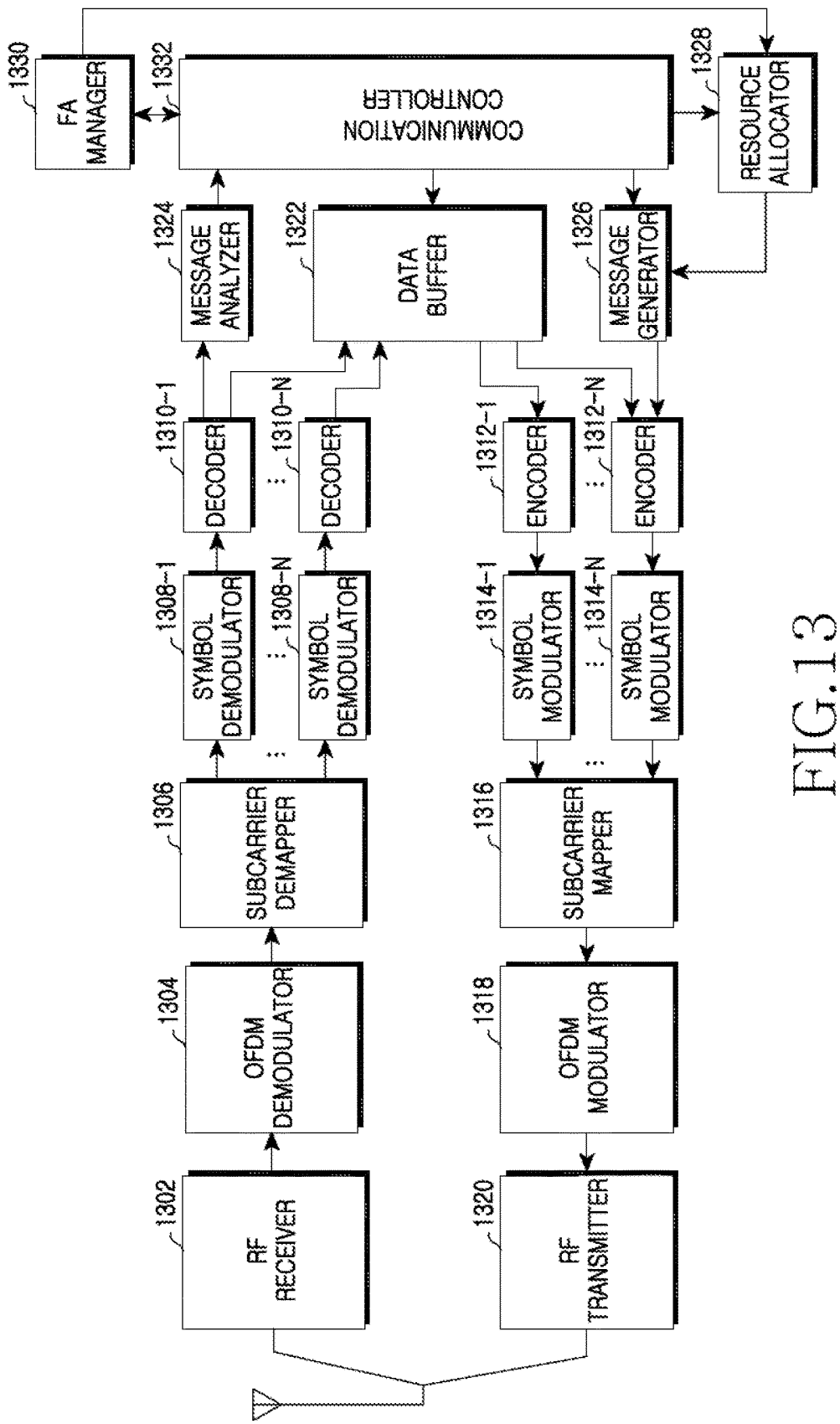
FIG. 13 is a block diagram illustrating a BS in a wireless communication system according to an exemplary embodiment of the present invention.

FIG. 13 is a block diagram illustrating a BS in the wireless communication system according to an exemplary embodiment of the present invention.

The BS of FIG. 13 includes an RF receiver 1302, an OFDM demodulator 1304, a subcarrier demapper 1306, a plurality of symbol demodulators 1308-1 through 1308-N, a plurality of decoders 1310-1 through 1310-N, a plurality of encoders 1312-1 through 1312-N, a plurality of symbol modulators 1314-1 through 1314-N, a subcarrier mapper 1316, an OFDM modulator 1318, an RF transmitter 1320, a data buffer 1322, a message analyzer 1324, a message generator 1326, a resource allocator 1328, an FA manager 1330, and a communication controller 1332.

The RF receiver 1302 down-converts an RF signal received via an antenna to a baseband signal. The OFDM demodulator 1304 divides the baseband signal output from the RF receiver 1302 on the OFDM symbol basis, eliminates the CP, and restores the frequency-domain complex symbols using the FFT operation. The subcarrier demapper 1306 divides the frequency-domain complex symbols on the FA basis and distributes the complex symbols to the symbol demodulators 1308-1 through 1308-N. The symbol demodulators 1308-1 through 1308-N each demodulate and convert the complex symbols to the encoded bit stream. The decoders 1310-1 through 1310-N each decode the encoded bit stream.

The encoders 1312-1 through 1312-N each encode the data bit stream transmitted over the respective FAs. The symbol modulators 1314-1 through 1314-N modulate the encoded bit stream transmitted over the respective FAs and convert to complex symbols. The subcarrier mapper 1316 maps the complex symbols output from the symbol modulators 1314-1 through 1314-N into the frequency domain. Since the symbol modulators 1314-1 through 1314-N correspond to the FAs respectively, the subcarrier mapper 1316 maps the complex symbols output from the symbol modulators 1314-1 through 1314-N to the different FAs. The OFDM modulator 1318 converts the complex symbols mapped to the frequency domain to time-domain signals using the IFFT operation, and constitutes OFDM symbols by inserting the CP. The RF transmitter 1320 up-converts the OFDM symbols to an RF signal and transmits the RF signal via the antenna. The data buffer 1322 temporarily stores the data exchanged with the MS and outputs the stored data under the control of the communication controller 1332.

The message analyzer 1324 analyzes the control message received from the MS, and provides the information obtained from the control message to the communication controller 1332. For instance, the message analyzer 1324 analyzes at least one of the S-FA off request message requesting to stop using the S-FA, the SLP-REQ message including the S-FA off request, an S-FA readiness indicator requesting to resume the suspended S-FA, the S-FA on request message requesting to resume the suspended S-FA, the S-FA readiness indicator informing of the start of the resumption of the suspended S-FA, the SLP-REQ message requesting the sleep mode entrance, the S-FA off response message informing of the reception of the S-FA off request, and the S-FA on response message informing of the reception of the S-FA on request.

The message generator 1326 generates the control message transmitted to the MS. For example, the message generator 1326 generates at least one of the S-FA off response message informing of the reception of the S-FA use suspension request, the SLP-RSP message including the S-FA off response, an S-FA readiness indicator ACK informing of the reception of the S-FA readiness indicator, the S-FA on response message informing of the determination result in relation with the S-FA on request, the S-FA off request message to request to stop using the S-FA, the S-FA on request message to request the resumption of the S-FA, and the SLP-RSP message including the S-FA off request. Particularly, as generating either the S-FA readiness indicator ACK or the S-FA on response message, the message generator 1326 adds the determination result of the BS including at least one of the approval of the usage resumption of the suspended S-FA, the disapproval of the usage resumption of the suspended S-FA, and the usage allowance of the new FA. As generating either the S-FA off request message or the SLP-RSP message including the S-FA off request, the message analyzer 1326 adds at least one of the use suspension request of the S-FA and the use allowance of the other FA.

The resource allocator 1328 allocates the radio resource to the MS. In the resource allocation, the resource allocator 1328 refers to the list of the used FAs of the MS provided from the FA manager 1330. More specifically, to allocate the resource to the MS, the resource allocator 1328 allocates the resources in the FAs belonging to the list of the used FAs of the MS. The FA manager 1330 manages the list of the used FAs of the accessed MS, and provides the FA use list of the MS to the resource allocator 1328. The FA manager 1330 updates the FA use list of the MS under the control of the communication controller 1332.

The communication controller 1332 controls the functions for the communication of the BS. The communication controller 1332 controls the operations and the signalings for the suspension and the resumption of the S-FA use. In the various embodiments of the present invention, the detailed operations of the communication controller 1332 are now described.

In an exemplary implementation, the when the message analyzer 1324 confirms the S-FA off request message, the communication controller 1332 controls the FA manager 1330 to exclude the S-FA from the FA use list of the MS. The communication controller 1332 controls the message generator 1326 to generate the S-FA off response message. Hence, the S-FA off response message is transmitted to the BS through the encoders 1312-1 through 1312-N, the symbol modulators 1314-1 through 1314-N, the subcarrier mapper 1316, the OFDM modulator 1318, and the RF transmitter 1320. The communication controller 1332 controls the FA manager 1330 to add the suspended S-FA into the FA use list of the MS. Next, when the message analyzer 1324 identifies the S-FA readiness indicator, the communication controller 1332 determines whether to permit the use request of the suspended S-FA. When not allowing the use request of the suspended S-FA, the communication controller 1332 determines whether the use of other FA may be allowed. The communication controller 1332 controls the message generator 1326 to generate the S-FA readiness indicator ACK notifying of its determination result.

In an exemplary implementation, distinctively, when the message analyzer 1324 confirms the SLP-REQ message, the communication controller 1332 determines whether the SLP-REQ message includes the S-FA off request. When the SLP-REQ message contains the S-FA off request, the communication controller 1332 controls the message generator 1326 to generate the SLP-RSP message including the S-FA off response message.

In an exemplary implementation, distinctively, when the message analyzer 1324 identifies the S-FA on request message, the communication controller 1332 determines whether to approve the use request of the suspended S-FA. When not allowing the use request of the suspended S-FA, the communication controller 1332 determines whether the use of the other FA may be permitted. Next, the communication controller 1332 controls the message generator 1326 to generate the S-FA on response message notifying of its determination result. The message analyzer 1324 identifies the S-FA readiness indicator, and the communication controller 1332 controls the FA manager 1330 to update the FA use status information of the MS.

In an exemplary implementation, distinctively, when the message analyzer 1324 confirms the SLP-REQ message, the communication controller 1332 determines whether the SLP-REQ message includes the S-FA off request. When the SLP-REQ message contains the S-FA off request, the communication controller 1332 controls the message generator 1326 to generate the SLP-RSP message including the S-FA off response message. When the message analyzer 1324 confirms the S-FA on request message, the communication controller 1332 determines whether to allow the use request of the suspended S-FA. When not allowing the use request of the suspended S-FA, the communication controller 1332 determines whether to permit the use of the other FA. Next, the communication controller 1332 controls the message generator 1326 to generate the S-FA on response message informing of its determination result. When the message analyzer 1324 identifies the S-FA readiness indicator, the communication controller 1332 controls the FA manager 1330 to add the suspended S-FA into the FA use list of the MS.

In an exemplary implementation, the communication controller 1332 determines whether to suspend the use of at least one S-FA. The suspension of the at least one S-FA is determined based on the signal strength measurement value of each S-FA reported from the MS, and the load of each S-FA. Determining to suspend the at least one S-FA, the communication controller 1332 determines whether to allow using other FA. When not allowing use of the other FA, the communication controller 1332 controls the message generator 1326 to generate the S-FA request message including the indication information of the suspended S-FA. Conversely, when allowing the use of the other FA, the communication controller 1332 controls the message generator 1326 to generate the S-FA request message including the indication information of the suspended S-FA and the newly allowed FA. When the message analyzer 1324 confirms the S-FA off response message, the communication controller 1332 controls the FA manager 1330 to erase the suspended S-FA from the FA use list of the MS. Next, when the use resumption of the suspended S-FA is determined, the communication controller 1332 controls the message generator 1326 to generate the S-FA on request message including the indication information of the resumed S-FA. When the message analyzer 1324 confirms the S-FA on response message and the S-FA readiness indicator, the communication controller 1332 controls the FA manager 1330 to add the suspended S-FA into the FA use list of the MS.

In an exemplary implementation, distinctively, when the message analyzer 1324 confirms the SLP-REQ message, the communication controller 1332 determines whether to permit the sleep mode entrance of the MS and whether to suspend the use of the at least one S-FA. Upon determining to suspend the at least one S-FA, the communication controller 1332 controls the message generator 1326 to generate the SLP-RSP message including the approval or the disapproval of the sleep mode entrance and the S-FA off request.

As set forth above, in the broadband wireless communication system employing the multiple FAs, the power consumption of the MS incurred in using the S-FA may be reduced by turning on and off the S-FA of the MS.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a wireless access node in a wireless communication system using a plurality of Frequency Assignments (FAs), the method comprising:
   determining to suspend use of a first Secondary (S)-FA of one or more S-FAs while communicating over a Primary (P)-FA and the one or more S-FAs;
   sending a first message which requests to suspend use of the first S-FA;
   communicating over at least the P-FA and excluding the first S-FA;
   determining to resume use of the first S-FA; and
   sending a second message which requests to resume use of the first S-FA.

2. The method of claim 1, wherein use of the first S-FA is suspended when a remaining battery capacity of a mobile station using the first S-FA is less than a threshold.

3. The method of claim 1, wherein use of the first S-FA is suspended when a load of the first S-FA is greater than a threshold.

4. The method of claim 1, wherein use of the first S-FA is suspended when a signal strength measurement value of the first S-FA is less than a threshold.

5. The method of claim 1, wherein the first message comprises at least one of indication information and off duration of the first S-FA, and the indication information comprises one of frequency information of the first S-FA, an index of the first S-FA, and an S-FA bitmap representing the first S-FA.

6. The method of claim 5, wherein the wireless access node is a base station, and the first message comprises information requesting to use an FA other than the first S-FA and indication information of the other FA.

7. The method of claim 1, wherein the wireless access node is a mobile station, and the first message comprises part of a sleep request message which requests a sleep mode entrance of the mobile station.

8. The method of claim 1, wherein the wireless access node is a base station, and the first message comprises part of a sleep response message which informs of approval or disapproval on a sleep mode entrance request of a mobile station.

9. The method of claim 1, further comprising receiving a third message which comprises a response for the request to resume use of the first S-FA.

10. The method of claim 9, wherein the wireless access node is a mobile station, and the third message comprises at least one of information allowing the resumption of the first S-FA, information disallowing the resumption of the first S-FA, and information allowing use of an FA other than the first S-FA.

11. The method of claim 9, further comprising:
   when the third message comprises at least one of information allowing the resumption of the first S-FA and information allowing use of an FA other than the first S-FA, preparing to use at least one of the first S-FA and the other FA; and
   when the preparation is completed, sending an S-FA readiness indicator.

12. A method for operating a wireless access node in a wireless communication system using a plurality of Frequency Assignments (FAs), the method comprising:
   receiving a first message which requests to suspend use of a first Secondary (S)-FA of one or more S-FAs while communicating over a Primary (P)-FA and the one or more S-FAs;
   communicating over at least the P-FA and excluding the first S-FA;

receiving a second message which requests to resume use of the first S-FA; and
communicating over at least the P-FA and the first S-FA.

13. The method of claim 12, wherein the first message comprises at least one of indication information and off duration of the first S-FA, and the indication information comprises one of frequency information of the first S-FA, an index of the first S-FA, and an S-FA bitmap representing the first S-FA.

14. The method of claim 13, wherein the wireless access node is a mobile station, and the first message comprises information requesting to use an FA other than the first S-FA and indication information of the other FA.

15. The method of claim 12, wherein the wireless access node is a base station, and the first message comprises part of a sleep request message which requests a sleep mode entrance of a mobile station.

16. The method of claim 12, wherein the wireless access node is a mobile station, and the first message comprises part of a sleep response message which informs of approval or disapproval on a sleep mode entrance request of the mobile station.

17. The method of claim 12, further comprising sending a third message which comprises a response for the request to resume use of the first S-FA.

18. The method of claim 17, wherein the wireless access node is a base station, and the third message comprises at least one of information allowing the resumption of the first S-FA, information disallowing the resumption of the first S-FA, and information allowing use of an FA other than the first S-FA.

19. The method of claim 17, wherein the wireless access node is a mobile station, and further comprising:
after sending the third message, preparing to use the first S-FA; and
when the preparation is completed, sending an S-FA readiness indicator.

20. The method of claim 17, wherein the wireless access node is a mobile station, and further comprising:
before sending the third message, preparing to use the first S-FA; and
when the preparation is completed, sending the third message to respond to the request to resume use of the first S-FA and to inform that use of the first S-FA may resume.

21. An apparatus for operating a wireless access node in a wireless communication system using a plurality of Frequency Assignments (FAs), the apparatus comprising a controller and a transmitter, the controller and the transmitter configured to:
determine, by the controller, to suspend use of a first Secondary (S)-FA of one or more S-FAs while communicating over a Primary (P)-FA and the one or more S-FAs;
send, by the transmitter, a first message which requests to suspend use of the first S-FA;
control, by the controller, communication over at least the P-FA and excluding the first S-FA;
determine, by the controller, to resume use of the first S-FA; and
send, by the transmitter, a second message which requests to resume use of the first S-FA.

22. The apparatus of claim 21, wherein use of the first S-FA is suspended when a remaining battery capacity of a mobile station using the first S-FA is less than a threshold.

23. The apparatus of claim 21, wherein use of the first S-FA is suspended when a load of the first S-FA is greater than a threshold.

24. The apparatus of claim 21, wherein use of the first S-FA is suspended when a signal strength measurement value of the first S-FA is less than a threshold.

25. The apparatus of claim 21, wherein the first message comprises at least one of indication information and off duration of the first S-FA, and the indication information comprises one of frequency information of the first S-FA, an index of the first S-FA, and an S-FA bitmap representing the first S-FA.

26. The apparatus of claim 25, wherein the wireless access node is a base station, and the first message comprises information requesting to use an FA other than the first S-FA and indication information of the other FA.

27. The apparatus of claim 21, wherein the wireless access node is a mobile station, and the first message comprises part of a sleep request message which requests a sleep mode entrance of the mobile station.

28. The apparatus of claim 21, wherein the wireless access node is a base station, and the first message comprises part of a sleep response message which informs of approval or disapproval on a sleep mode entrance request of a mobile station.

29. The apparatus of claim 21, wherein the apparatus further comprises a receiver, the receiver configured to:
receive a third message which comprises a response for the request to resume use of the first S-FA.

30. The apparatus of claim 29, wherein the wireless access node is a mobile station, and the third message comprises at least one of information allowing the resumption of the first S-FA, information disallowing the resumption of the first S-FA, and information allowing use of an FA other than the first S-FA.

31. The apparatus of claim 29, wherein the controller and the transmitter are further configured to:
prepare, by the controller, to use at least one of the first S-FA and the other FA when the third message comprises at least one of information allowing the resumption of the first S-FA and information allowing use of an FA other than the first S-FA; and
send, by the transmitter, an S-FA readiness indicator when the preparation is completed.

32. An apparatus for operating a wireless access node in a wireless communication system using a plurality of Frequency Assignments (FAs), the apparatus comprising at least a receiver and a controller, the receiver and the controller configured to:
receive, by the receiver, a first message which requests to suspend use of a first Secondary (S)-FA of one or more S-FAs while communicating over a Primary (P)-FA and the one or more S-FAs; and
control, by the controller, communication over at least the P-FA and excluding the first S-FA,
receive, by the receiver, a second message which requests to resume use of the first S-FA, and
control, by the controller, communication over at least the P-FA and the first S-FA.

33. The apparatus of claim 32, wherein the first message comprises at least one of indication information and off duration of the first S-FA, and the indication information comprises one of frequency information of the first S-FA, an index of the first S-FA, and an S-FA bitmap representing the first S-FA.

34. The apparatus of claim 33, wherein the wireless access node is a mobile station, and the first message comprises information requesting to use an FA other than the first S-FA and indication information of the other FA.

35. The apparatus of claim 32, wherein the wireless access node is a base station, and the first message comprises part of a sleep request message which requests a sleep mode entrance of a mobile station.

36. The apparatus of claim 32, wherein the wireless access node is a mobile station, and the first message comprises part of a sleep response message which informs of approval or disapproval on a sleep mode entrance request of the mobile station.

37. The apparatus of claim 32, wherein the apparatus further comprises a transmitter, the transmitter configured to:
   send a third message which comprises a response for the request to resume use of the first S-FA.

38. The apparatus of claim 37, wherein the wireless access node is a mobile station, and the controller and the transmitter are further configured to:
   before sending the third message, prepare, by the controller, to use the first S-FA; and
   when the preparation is completed, send, by the transmitter, the third message to respond to the request to resume use of the first S-FA and to inform that use of the first S-FA may resume.

39. The apparatus of claim 37, wherein the wireless access node is a base station, and the third message comprises at least one of information allowing the resumption of the first S-FA, information disallowing the resumption of the first S-FA, and information allowing use of an FA other than the first S-FA.

40. The apparatus of claim 37, wherein the wireless access node is a mobile station, and the controller and the transmitter are further configured to:
   after the third message is transmitted, prepare, by the controller, to use the first S-FA; and
   when the preparation is completed, send, by the transmitter, an S-FA readiness indicator.

\* \* \* \* \*